United States Patent
Mitsov et al.

(10) Patent No.: US 11,025,732 B2
(45) Date of Patent: Jun. 1, 2021

(54) METHOD AND APPARATUS TO PERFORM USER AUTHENTICATION DURING CLOUD PROVIDER SESSIONS

(71) Applicant: VMware Inc., Palo Alto, CA (US)

(72) Inventors: Georgi Mitsov, Kyustendil (BG);
Evgeny Aronov, Sofia (BG); Ivo Petkov, Sofia (BG); Alexander Dimitrov, Sofia (BG); Zahari Ivanov, Sofia (BG); Ivan Strelkov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/443,799

(22) Filed: Jun. 17, 2019

(65) Prior Publication Data
US 2020/0396299 A1    Dec. 17, 2020

(51) Int. Cl.
*H04L 29/08* (2006.01)
*H04L 29/06* (2006.01)
*G06F 9/48* (2006.01)

(52) U.S. Cl.
CPC .......... *H04L 67/146* (2013.01); *G06F 9/4843* (2013.01); *H04L 63/083* (2013.01); *H04L 67/10* (2013.01); *H04L 67/141* (2013.01)

(58) Field of Classification Search
CPC ... H04L 67/146; H04L 63/083; H04L 67/141; H04L 67/10; G06F 9/4843
See application file for complete search history.

(56) References Cited

U.S. PATENT DOCUMENTS

| | | | | |
|---|---|---|---|---|
| 6,011,798 A * | 1/2000 | McAlpine | ........... | H04L 12/5601 370/395.42 |
| 6,691,232 B1 * | 2/2004 | Wood | .................. | H04L 63/0815 726/6 |
| 6,769,068 B1 * | 7/2004 | Brozowski | .............. | H04L 63/08 726/1 |
| 7,774,611 B2 * | 8/2010 | Muntz | .................... | H04L 63/101 713/182 |
| 8,152,628 B2 * | 4/2012 | Kinsley | ................. | G06F 21/121 463/25 |
| 8,856,527 B1 * | 10/2014 | Schwengler | .......... | H04L 9/3263 713/150 |

(Continued)

OTHER PUBLICATIONS oauth.com, "Access Token Lifetime", retrieved from www.oauth.com/oauth2-servers/access-tokens/access-token-lifetime/, on Apr. 16, 2019, 7 pages.

*Primary Examiner* — Daniel C. Murray
(74) *Attorney, Agent, or Firm* — Hanley, Flight & Zimmerman, LLC

(57) ABSTRACT

Methods, apparatus, systems and articles of manufacture are disclosed to manage cloud provider sessions. The examples disclosed herein provide a system to manage cloud provider sessions. The system includes a session manger to establish a session using credentials associated with a cloud provider in response to detecting a request to establish the session with the cloud provider and to record a lifespan of a session token associated with the session. When the lifespan of the session token meets a threshold value, the session manager is to use the credentials to obtain a new session token to refresh the session. The system additionally includes a cloud provider adapter to, in response to detecting an action selection associated with a device, call the cloud provider to execute the action.

20 Claims, 10 Drawing Sheets

(56) References Cited

U.S. PATENT DOCUMENTS

| | | | |
|---|---|---|---|
| 8,862,870 B2 * | 10/2014 | Reddy | H04L 63/0428 713/153 |
| 8,893,246 B2 * | 11/2014 | Jover Segura | H04L 63/101 726/7 |
| 8,904,504 B2 * | 12/2014 | Burch | H04W 12/04 726/6 |
| 8,935,757 B2 * | 1/2015 | Srinivasan | H04L 63/10 726/4 |
| 9,009,653 B2 * | 4/2015 | Padmalata | G06Q 10/00 717/104 |
| 9,015,479 B2 * | 4/2015 | Jogand-Coulomb | G06F 21/10 380/277 |
| 9,100,190 B1 | 8/2015 | Schwengler | H04L 9/3263 |
| 9,286,455 B2 * | 3/2016 | Senthurpandi | H04L 63/0861 |
| 9,288,214 B2 * | 3/2016 | Chang | G06F 21/62 |
| 9,374,229 B1 | 6/2016 | Schwengler | H04L 9/3263 |
| 9,497,184 B2 * | 11/2016 | Fork | G06F 21/33 |
| 9,608,974 B2 * | 3/2017 | Barrows | H04L 63/0846 |
| 9,818,161 B2 * | 11/2017 | Voas | G06Q 50/32 |
| 9,819,647 B2 * | 11/2017 | Reddy | H04L 63/0428 |
| 9,894,067 B1 | 2/2018 | Mandadi | H04L 63/0876 |
| 9,900,160 B1 | 2/2018 | Barbour | H04L 9/3247 |
| 9,917,832 B2 * | 3/2018 | Burch | H04L 63/08 |
| 9,922,322 B2 * | 3/2018 | Flurscheim | G06Q 20/3821 |
| 10,097,551 B2 * | 10/2018 | Chan | H04L 63/083 |
| 10,122,707 B2 * | 11/2018 | Fork | G06F 21/33 |
| 10,182,044 B1 | 1/2019 | Praus | G06F 21/33 |
| 10,255,456 B2 * | 4/2019 | Guglani | G06F 21/335 |
| 10,270,753 B2 * | 4/2019 | Khylkouskaya | H04L 9/3228 |
| 10,277,569 B1 | 4/2019 | Barbour | H04L 63/061 |
| 10,346,607 B2 * | 7/2019 | Kruse | G06F 21/45 |
| 10,348,735 B2 * | 7/2019 | Anderson | H04L 63/0815 |
| 10,432,619 B2 * | 10/2019 | Burch | H04W 12/04 |
| 10,454,915 B2 * | 10/2019 | Mohamad Abdul | H04L 9/083 |
| 10,476,863 B1 * | 11/2019 | Hanlon | H04L 63/105 |
| 10,567,381 B1 | 2/2020 | Baer | H04L 63/104 |
| 10,574,644 B2 * | 2/2020 | Ananthapur Bache | H04L 63/0815 |
| 10,581,820 B2 | 3/2020 | Keshava | H04L 9/0894 |
| 10,623,185 B2 | 4/2020 | Schefenacker | H04L 9/30 |
| 10,643,001 B2 | 5/2020 | Guglani | H04W 12/1206 |
| 10,652,030 B1 | 5/2020 | Levy | H04L 9/3268 |
| 10,666,637 B2 * | 5/2020 | Cignetti | H04L 9/321 |
| 2007/0026942 A1 * | 2/2007 | Kinsley | G07F 17/3269 463/29 |
| 2007/0074282 A1 * | 3/2007 | Black | H04L 63/0471 726/14 |
| 2007/0204335 A1 * | 8/2007 | Zugenmaier | G06F 21/79 726/9 |
| 2009/0125992 A1 * | 5/2009 | Larsson | H04L 67/14 726/6 |
| 2010/0057843 A1 * | 3/2010 | Landsman | H04L 63/0876 709/203 |
| 2011/0202759 A1 * | 8/2011 | Hubbell | H04L 63/061 713/156 |
| 2011/0231899 A1 * | 9/2011 | Pulier | H04L 63/0272 726/1 |
| 2011/0321081 A1 * | 12/2011 | Lee | H04N 21/485 725/30 |
| 2012/0173870 A1 * | 7/2012 | Reddy | H04L 63/0428 713/153 |
| 2012/0185913 A1 * | 7/2012 | Martinez | G06F 9/45558 726/1 |
| 2012/0254957 A1 * | 10/2012 | Fork | H04L 63/0807 726/6 |
| 2013/0007845 A1 * | 1/2013 | Chang | H04L 63/104 726/4 |
| 2013/0019298 A1 * | 1/2013 | Jover Segura | H04L 63/1441 726/7 |
| 2013/0086645 A1 * | 4/2013 | Srinivasan | H04L 63/0815 726/4 |
| 2013/0156196 A1 * | 6/2013 | Jogand-Coulomb | G06F 21/10 380/278 |
| 2013/0326368 A1 * | 12/2013 | Voas | G06O 50/32 715/753 |
| 2014/0215587 A1 * | 7/2014 | Burch | H04W 12/04 726/6 |
| 2014/0245254 A1 * | 8/2014 | Padmalata | G06Q 10/06 717/104 |
| 2014/0278623 A1 * | 9/2014 | Martinez | G06Q 10/06 705/7.12 |
| 2014/0279201 A1 * | 9/2014 | Iyoob | G06F 9/5077 705/26.7 |
| 2014/0359098 A1 * | 12/2014 | Xu | H04L 63/0838 709/223 |
| 2015/0007274 A1 * | 1/2015 | Chang | H04L 63/0815 726/4 |
| 2015/0032626 A1 * | 1/2015 | Dill | G06Q 20/40 705/44 |
| 2015/0067322 A1 * | 3/2015 | Reddy | H04L 63/0428 713/153 |
| 2015/0121498 A1 * | 4/2015 | Burch | H04L 63/0853 726/7 |
| 2015/0172271 A1 * | 6/2015 | Barrows | H04L 63/0846 726/9 |
| 2015/0287030 A1 * | 10/2015 | Sagady | G06Q 20/3226 705/71 |
| 2016/0019636 A1 * | 1/2016 | Adapalli | H04L 47/70 705/26.62 |
| 2016/0065417 A1 * | 3/2016 | Sapuram | H04L 47/70 709/223 |
| 2016/0092696 A1 * | 3/2016 | Guglani | H04L 63/0428 726/26 |
| 2016/0140545 A1 * | 5/2016 | Flurscheim | H04L 63/0838 705/76 |
| 2017/0034255 A1 * | 2/2017 | Hanney | H04L 67/1097 |
| 2017/0048233 A1 * | 2/2017 | Khylkouskaya | H04L 63/083 |
| 2017/0070498 A1 * | 3/2017 | Fork | H04L 63/083 |
| 2017/0171191 A1 * | 6/2017 | Cignetti | H04L 9/321 |
| 2017/0339070 A1 * | 11/2017 | Chang | H04L 47/829 |
| 2018/0060989 A1 * | 3/2018 | Hietanen | G06K 7/10722 |
| 2018/0189783 A1 * | 7/2018 | Flurscheim | G06Q 20/3829 |
| 2018/0212774 A1 * | 7/2018 | Schefenacker | H04L 9/30 |
| 2018/0270225 A1 * | 9/2018 | Burch | H04L 63/08 |
| 2018/0285875 A1 * | 10/2018 | Law | G06Q 20/40 |
| 2018/0300471 A1 * | 10/2018 | Jain | H04L 63/108 |
| 2019/0188414 A1 * | 6/2019 | Guglani | H04W 12/1206 |
| 2019/0288956 A1 * | 9/2019 | Pulier | H04L 63/0272 |
| 2019/0387406 A1 * | 12/2019 | Goeringer | H04L 45/64 |
| 2020/0034521 A1 * | 1/2020 | Teng | G10L 19/018 |
| 2020/0059526 A1 * | 2/2020 | Goeringer | H04L 61/103 |
| 2020/0067905 A1 * | 2/2020 | Deshpande | G06F 21/335 |
| 2020/0092254 A1 * | 3/2020 | Goeringer | H04L 45/46 |
| 2020/0104473 A1 * | 4/2020 | Yu | H04L 63/102 |
| 2020/0106711 A1 * | 4/2020 | Sok | H04L 47/70 |
| 2020/0106782 A1 * | 4/2020 | Sion | H04L 67/10 |
| 2020/0127994 A1 * | 4/2020 | Kukreja | H04L 63/0807 |
| 2020/0153831 A1 * | 5/2020 | Baer | H04L 63/068 |

* cited by examiner

METHOD AND APPARATUS TO PERFORM USER AUTHENTICATION DURING CLOUD PROVIDER SESSIONS

FIELD OF THE DISCLOSURE

This disclosure relates generally to cloud management system and, more particularly, to methods and apparatus to manage cloud provider sessions.

BACKGROUND

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

BRIEF DESCRIPTION OF THE DRAWINGS

The figures are not to scale. In general, the same reference numbers will be used throughout the drawing(s) and accompanying written description to refer to the same or like parts.

Figure 1:
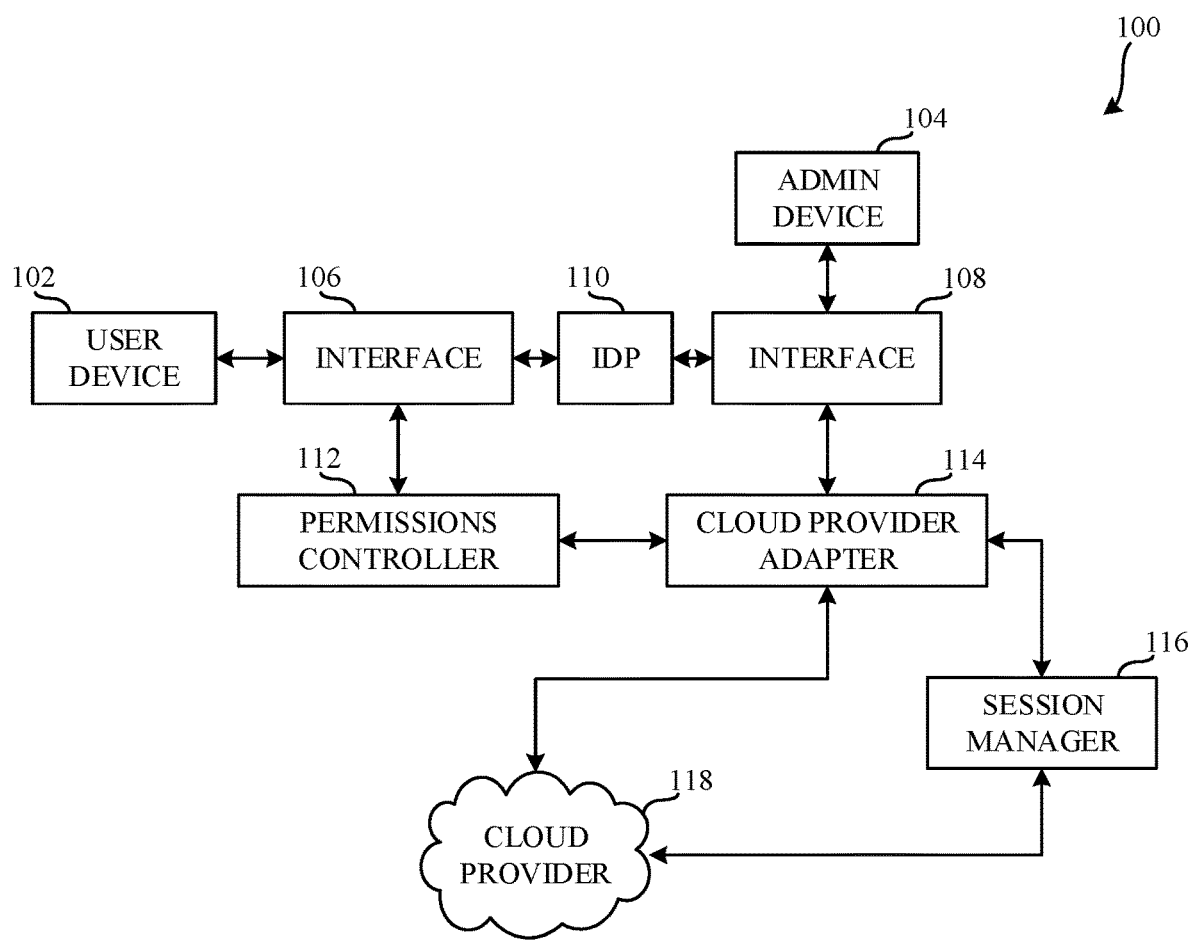
FIG. 1 is an illustration of a cloud management system to manage cloud provider sessions.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Virtualization technologies can be used for computing, storage, and/or networking, for example. Using virtualization, hardware computing resources and/or other physical resources can be replicated in software. One or more application programming interfaces (APIs) can be implemented to provide access to virtualized resources for users, applications, and/or systems while limiting or masking underlying software and/or hardware structure.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, which is hereby incorporated herein by reference in its entirety.

Certain examples provide multi-cloud management systems and/or platforms that manage a combination of public and private clouds (e.g., a hybrid cloud environment) running a variety of computing processes from traditional processes to virtual machines to container (e.g., cloud native) workloads. An example multi-cloud management platform can provision infrastructure and application resources with a choice of consumption (e.g., application programming interface (API), Catalog, command line interface (CLI), etc.) based on pre-defined policies and permissions. Provisioning and maintenance of resources are automated through creation of blueprints (e.g., models) that include components of requested services along with their relationships, including a mix of VM and container-based services. Integration can be extended to third party and/or customer applications, tools, etc.

In a virtual infrastructure, such as a multi-cloud management platform, an endpoint is a provisioned resource completing a provisioning process such as a public cloud resource (e.g., a web service such as Amazon Web Services (AWS), etc.), a virtual appliance (e.g., an external orchestrator appliance, etc.), a private cloud (e.g., hosted by VMware vSphere™ Microsoft Hyper-V™, etc.), etc. For example, a service has an endpoint that provides a specific function or feature of that service. The service may have multiple endpoints. For example, a catalog service provides catalog features via an endpoint for a shell/user interface application service to consume. Endpoints can include physical endpoints, virtual endpoints, Internet Protocol Address Management (IPAM) endpoints, etc. An endpoint type defines a set of one or more methods/functions that can be invoked, and an endpoint or endpoint instance is the object that implements or provides access to the methods/functions. An endpoint adapter enables the endpoint and the management system to communicate with each other. The endpoint adapter can facilitate/enable data/instruction communication, security, access control, redundancy, auditing, etc. If properly registered, an infrastructure-driven workflow can be launched for the endpoint via the endpoint adapter, for example.

Cloud computing platforms may provide many powerful capabilities for performing computing operations. Often, provisioned resources are configured during provisioning of infrastructure. Such configuration is often specific to the intended public cloud resource and/or IaaS provider. When using multiple clouds from different cloud providers, it is beneficial to use a single user interface for the user (e.g., customer) to interact with. In some examples, multiple users may access the same cloud provider at the same (e.g., when using IaaS to manage business-internal organizational cloud computing platforms). In such examples, each time a user accesses the cloud provider, the user must log into the cloud provider before being able to access the cloud resources. With multiple users using the cloud providers, multiple cloud provider session tokens are required for each user. This can result in hundreds of cloud provider session tokens which can cause issues with the IaaS provider or cloud provider.

In addition to the numerous cloud provider session tokens, many IaaS providers use user authentication tokens to identify the user accessing the IaaS provider. For example, an IaaS provider uses the OAuth 2.0 standard to authorize and/or otherwise identify users. The OAuth 2.0 standard specifies a protocol for requesting and providing user authentication tokens to verify that applications, VMs, or other hardware/software/firmware requesting data associated with a user are permitted to do so by either the user or a management system. The OAuth 2.0 includes two types of tokens, access tokens and refresh tokens. The access token is a user token with a specified lifetime. The lifetime can vary depending on the IaaS provider and there is no lifetime that works for every IaaS provider. Many IaaS providers limit the use of refresh tokens to obtaining access tokens because the refresh tokens have a much longer lifespan than access tokens. However, many IaaS providers avoid using refresh tokens and favor access tokens because the longer lifespan of refresh tokens presents a security risk.

When users are logged into an IaaS provider or cloud provider, the user may request tasks that can take an extended period of time to execute (e.g., overnight operations, week long operations, etc.). Additionally, some tasks may take an unspecified period of time to execute. For example, a task that may take an extended period of time to execute is provisioning a software defined datacenter (SDDC), provisioning a VM, or any other long-running task. In some of these long-running tasks, a user authentication may be required to complete one or more sub-tasks within the long-running task. For example, user authentication may be required to select a number of devices to provision in a requested SDDC. In other examples, user authentication may be required at the completion of provisioning a requested VM to, for example, assign an identifier to the VM. Furthermore, because of the unique characteristics of each of these long-running tasks, the period of time it takes to execute and/or otherwise execute may be unspecified and/or undeterminable.

In long-running tasks with unspecified execution times, the long-running tasks may require user authentication, the long-running tasks cannot proceed past the one or more sub-tasks that require user-authentication when the user is present and there is no way to know when user-authentication will be required. In such a scenario, an access token will expire unless it is refreshed. However, current standards will only refresh an access token when a user is interacting with or otherwise accessing an application or service associated with the long-running task. Thus, using the current standard, when executing a long-running task, an authorized user is required to be constantly interacting with an application or service associated with the long-running task in order to maintain a valid access token. This approach is undesirable because the long-running task has an unspecified length of time and a user may be required to continuously interact with the long-running task for the duration of the execution of the long-running task. If a user is not present, the user token will expire, and the long-running task will fail upon the next sub-task that requires an authorized user.

Examples disclosed herein prevent the problems associated with a large number of users accessing a cloud provider without reducing the number of users accessing the cloud provider. Examples disclosed herein reduce the number of cloud provider sessions while maintaining the number of users accessing the cloud provider and funnel user requests through one or more cloud provider sessions. Furthermore, the examples disclosed herein allow for long-running tasks and/or tasks with unspecified durations that require user authentication to complete execution without the need for user authentication regardless of the duration of the long-running task and the lifetime of the access token.

Examples disclosed herein provide a system to manage cloud provider sessions, the system comprising: a session manger to: in response to detecting a request to establish a session with a cloud provider, establish the session using credentials associated with the cloud provider; record a lifespan of a session token associated with the session; and when the lifespan meets a threshold value, use the credentials to obtain a new session token to refresh the session; and a cloud provider adapter to, in response to detecting an action selection associated with a device, call the cloud provider to execute the action.

FIG. 1 is an illustration of a cloud management system 100 to manage cloud provider sessions. The example cloud management system 100 includes an example user device 102, an example administrator device 104, and example first interface 106, an example second interface 108, an example identity provider 110, an example permissions controller 112, an example cloud provider adapter 114, an example session manager 116, and an example cloud provider 118.

In FIG. 1, the example user device 102 is communicatively coupled to the first interface 106. The example administrator device 104 is communicatively coupled to the second interface 108. In the example, the example first interface 106 is communicatively coupled to the user device 102, the identity provider 110, and the permissions controller 112. In the example, the second interface 108 is communicatively coupled to the administrator device 104, the identity provider 110, and the cloud provider adapter 114.

In the example of FIG. 1, the example permissions controller 112 is communicatively coupled to the example first interface 106 and the example cloud provider adapter 114. The example cloud provider adapter 114 is communicatively coupled to the second interface 108, the permissions controller 112, the session manager 116, the cloud provider 118. In the example, the session manager 116 is communicatively coupled to the cloud provider adapter 114, the cloud provider 118. In the example, the cloud provider 118 is communicatively coupled to the cloud provider adapter 114 and the session manager 116.

In the example of FIG. 1, the user device 102 is a work station. In other examples, the user device 102 is a personal computer, a laptop computer, a mobile phone, a tablet computer, or any suitable computer. In the example, a user (e.g., an employee, a customer, etc.) may use the user device 102 and user login credentials to log into the identity provider 110 and communicate with the cloud provider 118 via the permissions controller 112 and the cloud provider adapter 114. Additionally, the user may request actions from and/or otherwise communicate with the cloud provider 118 through the use of the user device 102. The cloud management system 100 may also include one or more additional user devices that one or more additional users may use to log into, request actions, and/or otherwise communicate with one or more of the identity provider 110 or cloud provider 118.

In FIG. 1, the example administrator device 104 is a work station. In other examples, the administrator device 104 is a personal computer, a laptop computer, a mobile phone, a tablet computer, or any suitable computer. In the example, an administrator (e.g., a manager, an informational technology (IT) professional, etc.) may use the administrator device 104 to setup an account associated with the cloud provider 118 through the use of the cloud provider adapter 114. For example, an administrator may use the administrator device 104 to setup a cloud provider network including cloud provider credentials by using the administrator token. The cloud management system 100 may also include one or more additional administrator devices that one or more additional administrators may use to log into and set up one or more cloud provider accounts via respective cloud provider adapters.

For example, in the example of FIG. 1, the user device 102 communicates with the first interface 106. For example, the first interface 106 is an API. For example, the API is VMware vCenter Server Appliance Management API. The example first interface 106 sets communication protocols between the user device 102 and the identity provider 110 and between the user device 102 and the permissions controller 112. The example first interface 106 additionally facilitates communications between the user device 102 and one or more of the identity provider 110 and the permissions controller 112. In other examples, the API may be the VMware vSphere Automation SDK, the VMware vSphere Management SDK, a Portable Operating System Interface (POSIX), or any other suitable interface.

In FIG. 1, the administrator device 104 communicates with the second interface 108. For example, the second interface 108 is an API. For example, the API is VMware vCenter Server Appliance Management API. The example second interface 108 sets communication protocols between the administrator device 104 and the identity provider 110 and between the administrator device 104 and the cloud provider adapter 114. The example second interface 108 additionally facilitates communications between the administrator device 104 and one or more of the identity provider 110 and the cloud provider adapter 114. In other examples, the API may be the VMware vSphere Automation SDK, the VMware vSphere Management SDK, a POSIX, or any other suitable interface.

In the example of FIG. 1, the identity provider 110 is one or more computers including the VMware Identity Manager. In additional or alternative examples, the identity provider 110 includes virtual computers, physical computers, or a combination thereof. In other examples, the identity provider 110 includes alternative identity as a service (IDaaS) providers. For example, the IDaaS provider may be OAuth 2.0, Okta, OneLogin, Hitachi ID Password Manager, Ping Identity, or any suitable IDaaS provider. In the example, the identity provider 110 generates a user token corresponding to the user credentials used to log into the identity provider 110 from the user device 102. Additionally, the example identity provider 110 generates an administrator token corresponding to the administrator credentials used to log into the identity provider 110 from the administrator device 104.

In FIG. 1, the example permissions controller 112 is one or more computers including vSphere 4.0—ESX and vCenter. In additional or alternative examples, the permissions controller 112 includes virtual computers, physical computers, or a combination thereof. In the example, the permissions controller 112 determines the types of actions and/or other communications available to a user based on the user token corresponding to the user. For example, a member of a software development team may have permissions corresponding to provision virtual machines whereas a member of an IT department member may have permissions corresponding organization and provisioning of virtual resources for an office. In the example, the permissions associated with a particular user are set by an administrator through the use of one or more of the second interface 108, the permissions controller 112, or the cloud provider adapter 114.

In the example illustrated in FIG. 1, the example cloud provider adapter 114 is one or more computers. In additional or alternative examples, the cloud provider adapter 114 includes virtual computers, physical computers, or a combination thereof. In the example, the cloud provider adapter 114 handles requests and/or other communications to and from the example cloud provider 118. For example, the example cloud provider adapter 114 monitors the permissions controller 112 and the second interface 108 (e.g., is to monitor a device, is to monitor one or more devices, is configured to monitor a device, is configured to monitor one or more devices, etc.) for requests and/or other communications corresponding to the user device 102 and the administrator device 104, respectively. For example, using the administrator device 104, an administrator may setup an account associated with the cloud provider 118 with corresponding cloud provider credentials. After setting up an account with the cloud provider 118 at the request of the administrator device 104, the cloud provider adapter 114 transmits the cloud provider credentials to the session manager 116. Additionally, for example, using the user device 102, a user may request that the cloud provider 118 provision a SDDC. In such an example, the cloud provider adapter 114 if the cloud provider adapter 114 has access to a valid session token, the cloud provider adapter 114 uses the session token to access the cloud provider 118. If the cloud provider adapter 114 does not have access to a valid session token, the cloud provider adapter 114 requests that the session manager 116 establish a session with the cloud provider 118. After the session is established, the cloud provider adapter 114 calls the cloud provider 118 to provision the SDDC. When the SDDC has been provisioned by the cloud provider 118, the cloud provider adapter 114 returns a notification of the completion of the request to the user device 102 via the permissions controller 112.

In the example of FIG. 1, the example session manager 116 is one or more computers. In additional or alternative examples, the session manager 116 includes virtual computers, physical computers, or a combination thereof. In the example, the session manager 116 after obtaining cloud provider credentials from the cloud provider adapter 114, the session manager 116 encrypts and stores the cloud provider credentials. The example session manager 116 then monitors for requests to establish a cloud provider session with the cloud provider 118. Upon receiving a request to establish a cloud provider session, the example session manager 116 determines whether the received request to establish the cloud provider session is the first request received for the cloud provider 118. If the received request to establish the cloud provider session is the first request received for the cloud provider 118, the example session manager 116 decrypts the cloud provider credentials associated with the cloud provider 118 and establishes a cloud provider session using the cloud provider credentials associated with the cloud provider 118. For example, when the session manager 116 establishes a cloud provider session with the cloud provider 118 the session manager 116 obtains a session token from the cloud provider 118. However, if the received request to establish the cloud provider session is not the first request received for the cloud provider 118, the example session manager 116 transmits the existing session token to the cloud provider adapter 114.

In the example of FIG. 1, after establishing the cloud provider session, the session manager 116 records the lifespan of the session token obtained from the cloud provider 118 and transmits the session token the cloud provider adapter 114. The example session manager 116 then monitors the remaining lifespan of the session token obtained from the cloud provider 118. When the session manager 116 determines that the lifespan of the session token associated with the cloud provider 118 is almost expired (e.g., meets a threshold value, is below a threshold value, is below a threshold refresh time, etc.), the session manager 116 decrypts the cloud provider credentials associated with the cloud provider 118 and uses the cloud provider credentials to obtain a new session token from the cloud provider 118 to refresh the cloud provider session and maintain access to the cloud provider. If the cloud provider session associated with the cloud provider 118 has been inactive for a substantial amount of time (e.g., 30 minutes), the session manager 116 deletes the cloud provider session by no longer refreshing the session token associated with the cloud provider session that has been inactive for a substantial amount of time. Otherwise, the session manager 116 records the lifespan for the session token and continues to monitor the lifespan of the session token.

In the example of FIG. 1, the cloud provider 118 may be any of a public cloud resource (e.g., a web service such as Amazon Web Services (AWS), etc.), a virtual appliance (e.g., an external orchestrator appliance, etc.), a private cloud (e.g., hosted by VMware vSphere™, Microsoft Hyper-V™, etc.), etc.

While the example illustrated in FIG. 1 shows the example session manager 116 in the context of a single cloud provider (e.g., the cloud provider 118), in other examples, the example session manager 116 manages cloud provider sessions for multiple cloud providers. In a multiple cloud provider example, the example session manager 116 manages multiple cloud provider credentials including individual cloud provider credentials corresponding to each of the cloud providers. Additionally, while the example of FIG. 1 illustrated the example permissions controller 112 communicating with the example cloud provider adapter 114 to handle requests from the user device 102, additional or alternative components may be included in the cloud management system 100 to facilitate and/or otherwise manager requests to the cloud provider 118. For example, the cloud management system 100 may additionally include an example task manager 312 communicatively coupled between the example cloud provider adapter 114 and the example first interface 106. In such an example, the task manager 312 manages the execution of tasks requested by the example user device 102. Additionally, in such an example, the cloud management system 100 includes a token manager 314 communicatively coupled to the example task manager 312 and the identity provider 110.

In the illustrated example of FIG. 1, in operation, the administrator device 104 obtains an administrator token from the identity provider 110 using administrator credentials provided by an administrator. Using the administrator token, the administrator device 104, through the use of the cloud provider adapter 114, sets up a cloud provider account associated with the cloud provider 118, the cloud provider account including cloud provider credentials. The cloud provider adapter 114 then transmits the cloud provider credentials to the session manager 116.

In the illustrated example of FIG. 1, in operation, the user device 102 obtains a user token from the identity provider 110 using user credentials provided by a user (e.g., an employee). Upon receiving the user token, the permissions controller 112 populates the first interface 106 with actions available to the user. The actions available to the user are specific to the user token obtained from the identity provider 110. The cloud provider adapter 114 then monitors the permissions controller 112 for a requested action from the user device 102. Upon receiving a requested action, the cloud provider adapter 114 calls the session manager 116 to establish cloud provider session user the cloud provider credentials received from the cloud provider adapter 114.

In FIG. 1, in operation, after the session manager 116 establishes a cloud provider session with the cloud provider 118, the cloud provider adapter 114 calls the cloud provider 118 to execute the requested action. After receiving the result and/or acknowledgement of the completion of the requested action, the cloud provider adapter 114 returns the result and/or acknowledgement to the user device 102. While the example illustrated in FIG. 1 shows the example cloud management system 100 in the context of a single user device (e.g., the user device 102), in other examples, the example cloud management system 100 includes multiple user devices.

Figure 2:
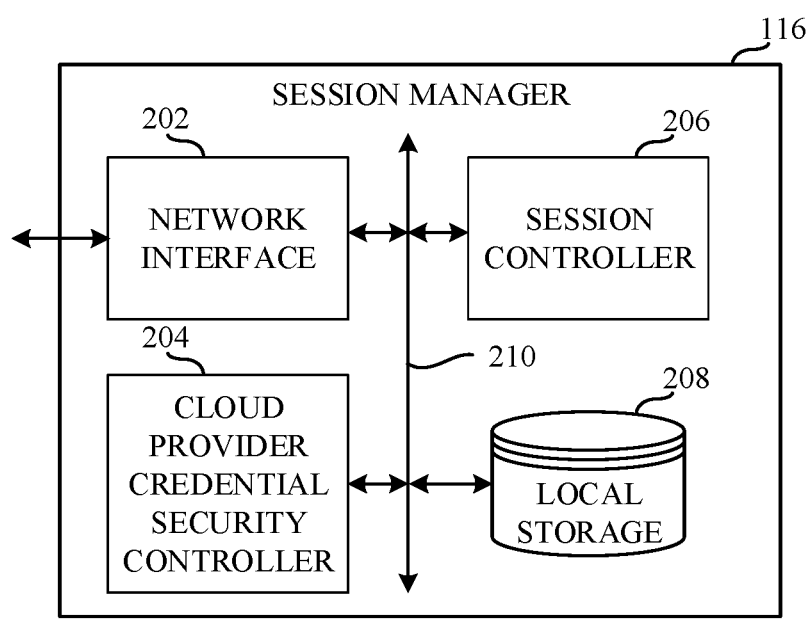
FIG. 2 is a block diagram showing further detail of the session manager of FIG. 1.

FIG. 2 is a block diagram showing further detail of the session manager 116 of FIG. 1. In the example, the session manager 116 includes an example network interface 202, an example cloud provider credential security controller 204, an example session controller 206, and example local storage 208. In the example, the example network interface 202, the example cloud provider credential security controller 204, the example session controller 206, and the example local storage 208 are communicatively coupled by an example communication bus 210.

In the illustrated example of FIG. 2, the network interface 202 is a device that connects the session manager 116 to a network. For example, the network interface 202 is a network interface controller. In some examples, the network interface 202 includes physical resources. In other examples, the network interface 202 includes virtual resources. In further examples, the network interface 202 is a combination of physical and virtual resources. In some examples, the example network interface 202 obtains and/or transmits information to and/or from the cloud provider adapter 114 and/or the cloud provider 118 of FIG. 1.

In the example illustrated in FIG. 2, the cloud provider credential security controller 204 is a device that controls the security of one or more cloud provider credentials obtained from one or more other devices (e.g., the cloud provider adapter 114). In the example, the cloud provider credential security controller 204 includes physical resources. In some examples, the cloud provider credential security controller 204 includes virtual resources. In the example, the cloud provider credential security controller 204 obtains cloud provider credentials associated with one or more cloud providers (e.g., the cloud provider 118) from one or more cloud provider adapters (e.g., the cloud provider adapter 114). Additionally, the example cloud provider credential security controller 204 encrypts the one or more cloud provider credentials using a private key stored in the local storage 208. In additional or alternative examples, the example cloud provider credential security controller 204 encrypts the one or more cloud provider credentials using a combination of the private key and a cloud provider specific salt to encrypt the cloud provider credentials as encrypted cloud provider credentials (e.g., encrypted credentials).

In the example of FIG. 2, after encrypting the cloud provider credentials, the example cloud provider credential security controller 204 stores the one or more cloud provider credentials in the local storage 208 as one or more encrypted cloud provider credentials. The example cloud provider credential security controller 204 additionally decrypts the one or more encrypted cloud provider credentials upon request. To this end, the cloud provider credential security controller 204 accesses the local storage 208 to read and decrypt the one or more encrypted cloud provider credentials. In some examples, the cloud provider credential security controller 204 decrypts the one or more encrypted credentials via an inverse cryptographic function corresponding to the cryptographic function used to encrypt the one or more encrypted cloud provider credentials.

In the example of FIG. 2, the example session controller 206 is a device that controls the storage of cloud provider credentials, refreshing of cloud provider session tokens, and/or fulfillment of requests to establish cloud provider sessions. In the example, the session controller 206 is a controller. In some examples, the session controller 206 is a PIC controller. In other examples, the session controller 206 includes virtual resources and/or physical resources. In the example, the session controller 206 monitors the network interface 202 for a request to establish a cloud provider session. Upon detecting a request to establish a cloud provider session, the example session controller 206 determines whether the received request to establish the cloud provider session is the first request received for the cloud provider. If the received request to establish the cloud provider session is the first request received for the cloud provider, the example session controller 206 requests the cloud provider credentials corresponding to the requested cloud. After obtaining the cloud provider credentials, the example session controller 206 established a cloud provider session with the cloud provider that was requested. To this end, the example session controller 206 obtains a cloud provider session token (e.g., a session token) from the cloud provider with which the session controller 206 established a cloud provider session. However, if the received request to establish the cloud provider session is not the first request received for the cloud provider, the example session controller 206 transmits the existing session token to the requesting device.

In FIG. 2, the example session controller 206 records a lifespan associated with the session token received from the cloud provider. After recording a lifespan associated with the session token, the example session controller 206 transmits the session token to the cloud provider credential security controller 204 to be stored in the local storage with the one or more encrypted cloud provider credentials. The example session controller 206 establishes a cloud provider session for each different cloud provider requested and obtains one or more different session tokens corresponding to one of more cloud providers for which the session controller 206 obtained a request to establish a session. When the lifespan of one or more tokens is nearing its end (e.g., meets a threshold value, meets a refresh threshold, is below a refresh threshold), the example session controller 206 requests from the cloud provider credential security controller 204 the one or more cloud provider credentials corresponding to the one or more session tokens near the end of their lifespan.

In the example illustrated in FIG. 2, after receiving the decrypted one or more cloud providers credentials corresponding to the one or more session tokens near the end of their lifespan, the example session controller 206 uses the one or more credentials to obtain one or more new session tokens from the one or more cloud providers corresponding to the one or more cloud provider credentials. After receiving the one or more new session tokens, the session controller 206 determines whether any of the cloud provider sessions have been inactive for a substantial amount of time (e.g., a threshold time). For example, the session controller 206 determine that a cloud provider session has been inactive for a substantial amount of time if the session controller 206 has not received a request to establish a cloud provider session within 30 minutes of the last request to establish a cloud provider session for a corresponding cloud provider. If a cloud provider session has been inactive for a substantial amount of time, the session controller 206 requests that the cloud provider credential security controller 204 delete the cloud provider session by no longer refreshing the session token associated with the cloud provider session that has been inactive for a substantial amount of time.

In the example of FIG. 2, the example local storage 208 is a volatile memory. For example, the local storage 208 may be Synchronous Dynamic Random Access Memory (SDRAM), Dynamic Random Access Memory (DRAM), RAMBUS® Dynamic Random Access Memory (RDRAM®) and/or any other type of random access memory device. In the example, the local storage 208 stores one or more encrypted cloud provider credentials, one or more private keys, and one or more salts corresponding to the one or more cloud providers.

Figure 3:
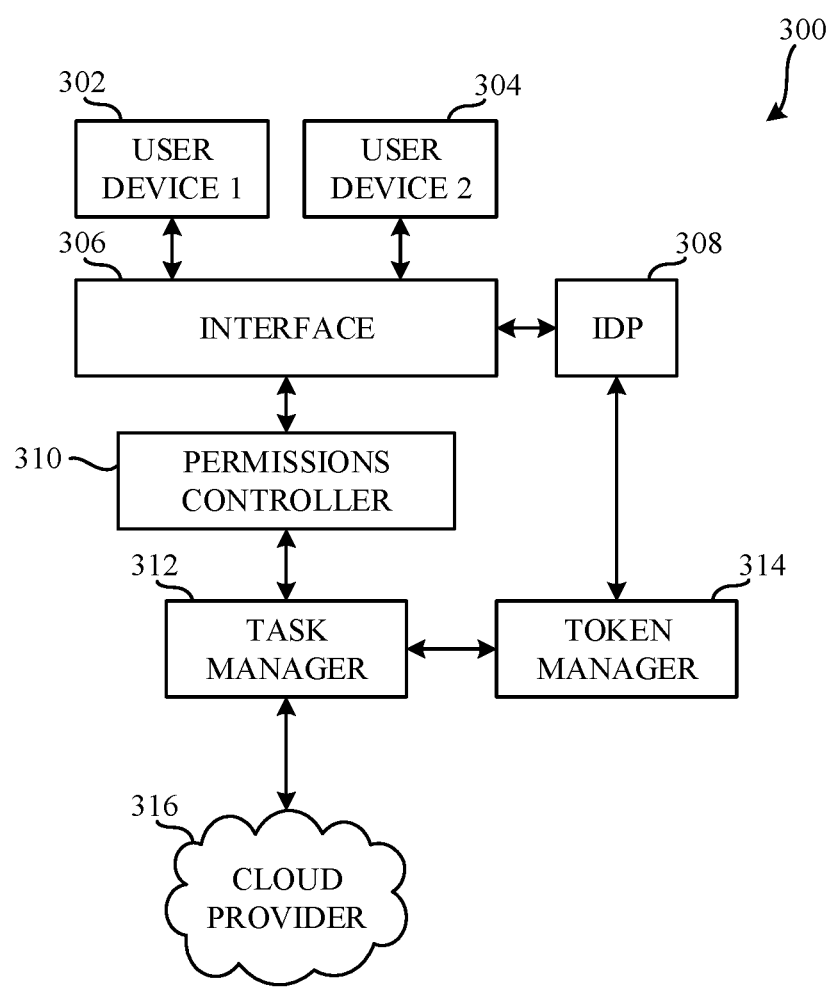
FIG. 3 is an illustration of a task management system including a token manager for facilitating long-running tasks.

FIG. 3 is an illustration of a task management system 300 including an example token manager 314 for facilitating long-running tasks. The example task management system 300 includes an example first user device 302, an example second user device 304, an example interface 306, an example identity provider 308, an example permissions controller 310, an example task manager 312, an example token manager 314, and an example cloud provider 316.

In the illustrated example of FIG. 3, the example first user device 302 is communicatively coupled to the example interface 306. The example second user device 304 is communicatively coupled to the example interface 306. The example interface 306 is communicatively coupled to the example first user device 302, the example second user device 304, the example identity provider 308, and the example permission controller 310.

In the example of FIG. 3, the example identity provider 308 is communicatively coupled to the example interface 306 and the example token manager 314. The example permissions controller 310 is communicatively coupled to the example interface 306 and the example task manager 312. In the example, the example task manager 312 is communicatively coupled to the example permission controller 310, the example token manager 314, and the example cloud provider 316. The example token manager 314 is communicatively coupled to the example identity provider 308 and the example task manager 312. In the example, the example cloud provider 316 is communicatively coupled to the example task manager 312.

In the example of FIG. 3, the first user device 302 is a work station. In other examples, the first user device 302 is a personal computer, a laptop computer, a mobile phone, a tablet computer, or any suitable computer. In the example, a user (e.g., an employee, a customer, etc.) may use the first user device 302 and user login credentials to log into the identity provider 308 and communicate with the cloud provider 316 via the permissions controller 310 and the task manager 312. Additionally, the user may request actions from and/or otherwise communicate with the cloud provider 316 through the use of the first user device 302.

In FIG. 3, the second user device 304 is a work station. In other examples, the second user device 304 is a personal computer, a laptop computer, a mobile phone, a tablet computer, or any suitable computer. In the example, a user (e.g., an employee, a customer, etc.) may use the second user device 304 and user login credentials to log into the identity provider 308 and communicate with the cloud provider 316 via the permissions controller 310 and the task manager 312. Additionally, the user may request actions from and/or otherwise communicate with the cloud provider 316 through the use of the second user device 304.

In the example of FIG. 3, the interface 306 facilitates communications between one or more of the first user device 302, the second user device 304, the identity provider 308, the permissions controller 310, the task manager 312, or the cloud provider 316. For example, the interface 306 is an API. For example, the API is VMware vCenter Server Appliance Management API. The example interface 306 sets communication protocols between one or more of the first user device 302, the second user device 304 and the identity provider 308 and between the first user device 302, the second user device 304, and the permissions controller 310. In other examples, the API may be the VMware vSphere Automation SDK, the VMware vSphere Management SDK, a POSIX, or any other suitable interface.

In the example of FIG. 3, the identity provider 308 is one or more computers including OAuth 2.0. In additional or alternative examples, the identity provider 308 includes virtual computers, physical computers, or a combination thereof. In other examples, the identity provider 308 includes alternative IDaaS providers that offer refreshable tokens. In the example, the identity provider 308 generates a user token (e.g., an access token) corresponding to the user credentials used to log into the identity provider 308 from the first user device 302 and/or the second user device 304. Additionally, the example identity provider 308 allows the token manager 314 to refresh one or more user tokens (e.g., access tokens) with the identity provider 308.

In the illustrated example of FIG. 3, the example permissions controller 310 is one or more computers including vSphere 4.0—ESX and vCenter. In additional or alternative examples, the identity provider 308 includes virtual computers, physical computers, or a combination thereof. In the example, the permissions controller 310 determines the types of actions and/or other communications available to a user based on the user token corresponding to the user. For example, a member of a software development team may have permissions corresponding to provision virtual machines whereas a member of an IT department member may have permissions corresponding organization and provisioning of virtual resources for an office. In the example, the permissions associated with a particular user are set by an administrator and/or the IaaS provider. After populating the actions available to a user, the permissions controller 310 transmits the user token to the task manager 312.

In the example of FIG. 3, the example task manager 312 is one or more computers that manages the execution of tasks requested from one or more of the first user device 302 and the second user device 304. In the example, when a task or other action is requested by one or more of the first user device 302 and the second user device 304, the example task manager 312 determines whether the requested task or action includes a long-running or unspecified duration. For example, the interface 306 may specify that requests to the cloud provider 318 include lifespans if known. If the request includes a lifespan that is sufficiently long (e.g., more than 15 minutes) or the lifespan field is unpopulated, the example task manager 312 transmits a user token corresponding to the user that requested the task and/or other action to the token manager 314 and obtains a handle corresponding to the user token from the token manager 314.

In the example of FIG. 3, the example task manager 312 may additionally determine that a task is long-running or includes an unspecified duration based on the characteristics of the requested task. For example, a task that requires the input of a user to proceed past a certain sub-task may be categorized as include an unspecified duration. Additionally, a task that includes a long-running duration may be a task that requires the transferal of large amounts of data. For example, creating and or loading a system image of a computer may require the transferal of large amounts of data that may take several minutes to hours to complete. Furthermore, tasks or workflows that interact with third-party system may be considered long-running or as including an unspecified duration. For example, if a task requests a third-party cloud provider to provision a virtual machine (or several virtual machines), if task manager 312 does not have a service level agreement (SLA), or the SLA specifies an extended period of time in which the third-party cloud provider can respond, the task manager 312 has no way of knowing how long it will take the third-party cloud provider to provision the one or more virtual machines. Moreover, a task that has been previously run and failed due to token expiration may be considered long-running or as including an unspecified duration. Other tasks may be considered long-running or as including an unspecified duration if they are known to historically fail and retry on redundant resources. If a task exhibits any of the characteristics specified above, the example task manager 312 may classify the task as long-running or as including an unspecified duration, depending on the characteristic of the task. Additionally, or alternatively, the example task manager 312 may classify a task as long-running or as including an unspecified duration if the task includes characteristics similar to those listed above.

In the example illustrated in FIG. 3, if the task manager 312 does not identify the task as long-running or as including an unspecified, the example task manager 312 proceeds to execute the sub-tasks of the requested task using the user token (e.g., access token). If the task manager 312 identifies the task as long-running or as including an unspecified, the task manager 312 transmits the user token (e.g., access token) to the example token manager 314 and obtains a handle corresponding to the user token. As the task manager 312 executes, and/or requests to be executed, the sub-tasks of the requested task (e.g., long-running task or task including unspecified duration), the task manager 312 monitors the cloud provider 316 for a user authorization requirement. Sub-tasks that may require user authorization include naming a VM after it has been provisioned, selecting a number of devices to provision in a SDDC, designating permissions associated with a newly created user account, or any other task where a user's or an administrator's input is required.

In the example of FIG. 3, if user authorization is required for a sub-task of the requested task, the example task manager 312 accesses the user token by transmitting the handle to the token manager 314 to obtain the user token. After the user token is used, the task manager 312 determines whether there are additional sub-tasks to be executed. For example, the task manager 312 may break down the sub-tasks associated with a requested task and load the sub-tasks into a queue for execution. In other examples, the task manager 312 may schedule the sub-tasks of the requested task according to interdependencies of the sub-tasks. If there are additional sub-tasks to be executed (tasks remaining in the queue), the task manager 312 transmits the user token back to the token manager 314 and/or retrieves an alternative handle corresponding to the user token from the token manager 314. If there are not additional sub-tasks to be executed, the task manager 312 completes the overall task. For example, if a task is to provision a VM, completing the overall task may include storing the VM configuration files on a virtual hard drive or other memory. After completing the overall task, the task manager 312 transmits an acknowledgement to the token manager 314 indicating that the particular user token is no longer needed.

In the example of FIG. 3, the example token manager 314 is one or more computers that manage user tokens (e.g., access tokens) to ensure that the user tokens are available to a user or a task manager (e.g., the task manager 312) that is executing a task on behalf of the user. The example token manager 314 monitors a task manger (e.g., the example task manager 312) for user tokens from the task manager. Upon receiving the user tokens from a task manager (e.g., the example task manager 312), the example token manager 314 generates a handle corresponding to the user token. For example, the token manager 314 generates a handle including a universally unique identifier (UUID). In other examples, the token manager 314 generates handle including a globally unique identifier (GUID). In the example of FIG. 3, the example token manager 314 generates a handle including a hashed version of a user's information. For example, the handle generated by the example token manager 314 includes a hashed version of a user's username. After generating the handle corresponding to the user token, the example token manager 314 transmits the handle to a task manager (e.g., the task manager 312). The example token manager 314 additionally records the lifespan of the user token and then encrypts the user token and stores the user token in memory. Additionally, the example token manager 314 stores an entity identifier corresponding to the user device and/or task manager that transmitted the user token to the token manager 314 and may additionally encrypt the entity identifier. For example, the token manager 314 encrypts one or both of user tokens and entity identifiers using a private key stored in the token manager 314. Additionally or alternatively, the example token manager 314 encrypts one or both of user tokens and entity identifiers using a salt based on the handle. When the example token manager 314 stores encrypted user tokens and the entity identifiers in memory, the example token manager 314 maps the encrypted user tokens and the entity identifiers to the corresponding handles.

In the example of FIG. 3, the entity identifier may be based on client side certificates or other forms of public key infrastructure (PKI). For example, the example token manager 314 may store a serial number associated with the certificate of a client. Alternatively, the entity identifier may be based on the OAuth 2.0 token. For example, the token manager 314 may extract the principal of the OAuth 2.0 token and store the principal value in memory as the entity identifier.

In FIG. 3, the example token manager 314 monitors the lifespan of the user tokens stored in memory. When the lifespan of one or more tokens meets (e.g., is below) a refresh threshold time, the example token manager 314 decrypts the one or more user tokens and requests a new user token from an identity provider (e.g., the identity provider 308). After receiving one or more new tokens from the identity provider, the example token manager 314 encrypts the one or more new user tokens and stores the one or more encrypted new user tokens.

In the example illustrated in FIG. 3, the example token manager 314 additionally monitors a task manger (e.g., the task manager 312) for a request for a user token. For example, a request for a user token includes receiving a handle from a task manager. If the example token manager 314 detects a request for a user token, the token manager 314 determines whether an entity requesting the user token is the same entity as the entity that stored the user token with the token manager 314. For example, the token manager 314 compares an entity identifier stored in memory with the entity identifier presented by the entity requesting the user token. If the token manager 314 determines that the entity requesting the user token is not the same entity that stored the user token or an entity permitted to request the user token on behalf of the entity that stored the user token (e.g., an authorized device), the example token manager 314 denies the request.

After determining that the entity requesting the user token is the same entity that stored the user token or an entity permitted to request the user token on behalf of the entity that stored the user token, the example token manager 314 locates the user token corresponding to the handle received from the task manger and decrypts the user token and transmits the user token to the task manager.

In the example of FIG. 3, after storing one or more encrypted new user tokens or transmitting a user token to a task manager, the example token manager 314 determines whether the handle is needed. For example, if the example token manager 314 receives a notification from a task manager (e.g., the task manager 312) indicating that the user token is no longer needed, the example token manager 314 determines that the user token is no longer needed. In response to determining that one or more user token is no longer needed, the example token manager 314 deletes one or more user tokens that are no longer needed. Additionally, the example token manager 314 can delete one or more user tokens when the user tokens have existed for an extended period of time. For example, the example token manager 314 may include a no-use threshold time limit. In such an example, the no-use threshold time limit corresponds to a set time limit on how long a user token will be refreshed without being called by a task manager. If the example token manager 314 determines the no-use threshold time limit has been reached, the example token manager 314 deletes one or more tokens that have exceeded their respective no-use threshold time limits. If additional tokens exist, the example token manager 314 continues to monitor one or more task managers for a handle request and continues to monitor the lifespans of the one or more remaining tokens.

In FIG. 3, the cloud provider 316 may be any of a public cloud resource (e.g., a web service such as Amazon Web Services (AWS), etc.), a virtual appliance (e.g., an external orchestrator appliance, etc.), a private cloud (e.g., hosted by VMware vSphere™, Microsoft Hyper-V™, etc.), etc.

Figure 4:
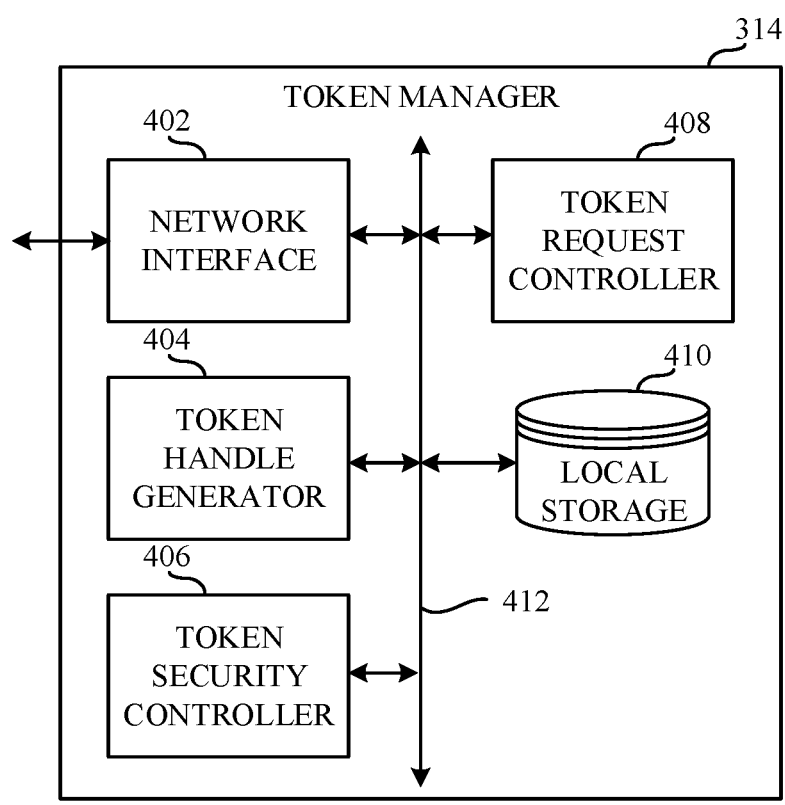
FIG. 4 is a block diagram showing further detail of the token manager of FIG. 3.

FIG. 4 is a block diagram showing further detail of the token manager 314 of FIG. 3. In the example, the token manager 314 includes an example network interface 402, an example token handle generator 404, an example token security controller 406, an example token request controller 408, and example local storage 410. In the example, the example network interface 402, the example token handle generator 404, the example token security controller 406, the example token request controller 408, and the example local storage 410 are communicatively coupled by an example communication bus 412.

In the illustrated example of FIG. 4, the network interface 402 is a device that connects the token manager 314 to a network. For example, the network interface 402 is a network interface controller. In some examples, the network interface 402 includes physical resources. In other examples, the network interface 402 includes virtual resources. In further examples, the network interface 402 is a combination of physical and virtual resources. In some examples, the example network interface 402 obtains and/or transmits information to and/or from the task manager 312 and/or the identity provider 308 of FIG. 3.

In the example of FIG. 4, the token handle generator 404 is a device that generates handles for tokens obtained by the example token manager 314 at the network interface 402. For example, the token handle generator 404 includes physical resources. In other examples, the token handle generator 404 includes virtual resources. In the example of FIG. 4, the token handle generator 404 monitors the network interface 402 for user tokens from a task manager (e.g., the task manager 312). If the token handle generator 404 receives a user token from a task manger (e.g., the task manager 312), the example token handle generator 404 generates a handle corresponding to the user token. For example, the token handle generator 404 generates a handle including a UUID. In other examples, the token handle generator 404 generates a handle including a GUID. In the example of FIG. 4, the example token handle generator 404 generates a handle including a hashed version of a user's information. For example, the handle generated by the example handle generator 404 includes a hashed version of a user's username. After generating the handle corresponding to the user token, the example token handle generator 404 transmits the handle to a task manager (e.g., the task manager 312) and the token security controller 406.

In the example illustrated in FIG. 4, the token security controller 406 is a device that controls the security of one or more user tokens (e.g., access tokens) obtained from one or more other devices (e.g., the task manager 312). In the example, the token security controller 406 includes physical resources. In some examples, the token security controller 406 includes virtual resources. In the example, the token security controller 406 obtains user tokens associated with one or more devices (e.g., the first user device 302, the second user device 304, etc.) from one or more task managers (e.g., the task manager 312). Additionally, the example token security controller 406 encrypts the one or more user tokens using a private key stored in the local storage 410. In additional or alternative examples, the example token security controller 406 encrypts the one or more user tokens using a combination of the private key and a user specific salt to encrypt the user token. Additionally, the example token security controller 406 retrieves and/or extracts an entity identifier from the entity corresponding to the user device and/or task manager that transmitted the user token to the token manager 314. In some examples, the example token security controller 406 additionally encrypts the entity identifier. Furthermore, the example token security controller 406 maps the handles generated by the token handle generator 404 to the corresponding user token and entity identifier stored in the local storage 410.

In the example of FIG. 4, after encrypting the user tokens and/or the entity identifiers, the example token security controller 406 stores the one or more user tokens and/or entity identifiers in the local storage 410 as one or more encrypted user tokens and/or one or more entity identifiers. The example token security controller 406 additionally decrypts the one or more encrypted user tokens when the user tokens are to be refreshed. To this end, the token security controller 406 accesses the local storage 410 to decrypt the one or more encrypted user tokens. In some examples, the token security controller 406 decrypts the one or more encrypted user tokens via an inverse cryptographic function corresponding to the cryptographic function used to encrypt the one or more encrypted user tokens.

In the example of FIG. 4, the example token request controller 408 is a device that manages user tokens, refreshes user tokens, and/or deletes user tokens based on signals and/or requests received from the network interface 402. In the example, the token request controller 408 is a controller. In some examples, the token request controller 408 is a PIC controller. In other examples, the token request controller 408 includes virtual resources and/or physical resources. In the example, the token request controller 408 monitors the network interface 402 for user tokens from a token manager (e.g., the token manager 314). After receiving a user token from a token manager and/or other user device, the example token request controller 408 records the lifespan of the user token and transmits the user token to the example token security controller 406. Upon determining the lifespan of the user token is within a threshold time to refresh, the example token request controller 408 transmits a signal to the example token security controller 406 to decrypt one or more tokens with corresponding lifespans that meet (e.g., are below) the refresh threshold and the token request controller 408 requests one or more new user tokens from an identity provider (e.g., the identity provider 308). After obtaining the one or more new user tokens, the example token request controller 408 transmits a signal to the example token security controller 406 to encrypt the one or more user tokens.

In the example of FIG. 4, the example token request controller 408 additionally monitors one or more devices (e.g., the first user device 302, the second user device 304, the task manager 312, etc.) for a request for a user token. For example, a request for a user token includes receiving a handle from a task manager. If the example token request controller 408 detects a request for a user token, the token request controller 408 calls the example token security controller 406 to determine whether an entity requesting the user token is the same entity as the entity that stored the user token with the token manager 314. For example, after receiving a call from the token request controller 408, the token security controller 406 compares an entity identifier stored in memory with the entity identifier presented by the entity requesting the user token. If the token security controller 406 determines that the entity requesting the user token is not the same entity that stored the user token or an entity permitted to request the user token on behalf of the entity that stored the user token (e.g., an authorized device), the example token security controller 406 transmits a signal to the token request controller 408 indicating that the requesting entity is not the same as the entity that stored the token. In response to receiving the signal indicating the requesting entity is not the same as the entity that stored the token, the example token request controller 408 denies the request and continues to monitor for handle requests.

In the example of FIG. 4, after the token security controller 406 determines that the entity requesting the user token is the same entity that stored the user token, or an entity permitted to request the user token on behalf of the entity that stored the user token, the example token request controller 408 indicates to the example token security controller 406 to decrypt the user token corresponding to the requesting entity. The example token security controller 406 decrypts the user token and transmits the decrypted user token to the requesting entity.

In the example of FIG. 4, after the example token security controller 406 stores one or more encrypted new user tokens or the example token request controller 408 transmits a user token to a requesting device, the example token request controller 408 determines whether the handle is needed. For example, if the example token request controller 408 receives a notification from a device (e.g., the task manager 312) indicating that the user token is no longer needed, the example token request controller 408 determines that the user token is no longer needed. In response to determining that one or more user token is no longer needed, the example token request controller 408 sends a signal to the example local storage 410 to delete one or more user tokens that are no longer needed. Additionally, the example token request controller 408 can send a signal to the local storage 410 to delete one or more user tokens when the user tokens have existed for an extended period of time. For example, the example token request controller 408 may include a no-use threshold time limit. In such an example, the no-use threshold time limit corresponds to a set time limit on how long a user token will be refreshed without being called by a device. If the example token request controller 408 determines the no-use threshold time limit has been reached, the example token request controller 408 sends a signal to the local storage 410 to delete one or more tokens that have exceeded their respective no-use threshold time limits. If additional tokens exist, the example token request controller 408 continues to monitor one or more devices for a handle request and continues to monitor the lifespans of the one or more remaining tokens.

In the example of FIG. 4, the example local storage 410 is a volatile memory. For example, the local storage 410 may be Synchronous Dynamic Random Access Memory (SDRAM), Dynamic Random Access Memory (DRAM), RAMBUS® Dynamic Random Access Memory (RDRAM®) and/or any other type of random access memory device. In the example, the local storage 410 stores one or more encrypted user tokens, one or more private keys, one or more salts corresponding to one or more devices (e.g., user devices), one or more entity identifiers corresponding to the one or more devices. In alternative examples, the local storage 410 stores encrypted entity identifiers corresponding to the one or more devices.

While an example manner of implementing the session manager 116 of FIG. 1 is illustrated in FIG. 2, one or more of the elements, processes and/or devices illustrated in FIG. 2 may be combined, divided, re-arranged, omitted, eliminated and/or implemented in any other way. Further, the example network interface 202, the example cloud provider credential security controller 204, the example session controller 206, the local storage 208 and/or, more generally, the example session manager 116 of FIG. 2 may be implemented by hardware, software, firmware and/or any combination of hardware, software and/or firmware. Thus, for example, any of the example network interface 202, the example cloud provider credential security controller 204, the example session controller 206, the local storage 208 and/or, more generally, the example session manager 116 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 202, the example cloud provider credential security controller 204, the example session controller 206, the local storage 208 and/or, more generally, the example session manager 116 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example session manager 116 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the session manager 116 of FIG. 2 is shown in FIGS. 1 and 2. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 6, many other methods of implementing the example session manager 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

While an example manner of implementing the token manager 314 of FIG. 3 is illustrated in FIG. 4, one or more of the elements, processes and/or devices illustrated in FIG. 4 may be combined, divided, re-arranged, omitted, eliminated and/or implemented in any other way. Further, the example network interface 402, the example token handle generator 404, the example token security controller 406, the example token request controller 408, the local storage 410 and/or, more generally, the example token manager 314 of FIG. 3 may be implemented by hardware, software, firmware and/or any combination of hardware, software and/or firmware. Thus, for example, any of the example network interface 402, the example token handle generator 404, the example token security controller 406, the example token request controller 408, the local storage 410 and/or, more generally, the example token manager 314 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 402, the example token handle generator 404, the example token security controller 406, the example token request controller 408, the local storage 410 and/or, more generally, the example token manager 314 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example token manager 314 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the token manager 314 of FIG. 3 is shown in FIGS. 3 and 4. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 8, many other methods of implementing the example token manager 314 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 5, 6, 7, and 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 5:
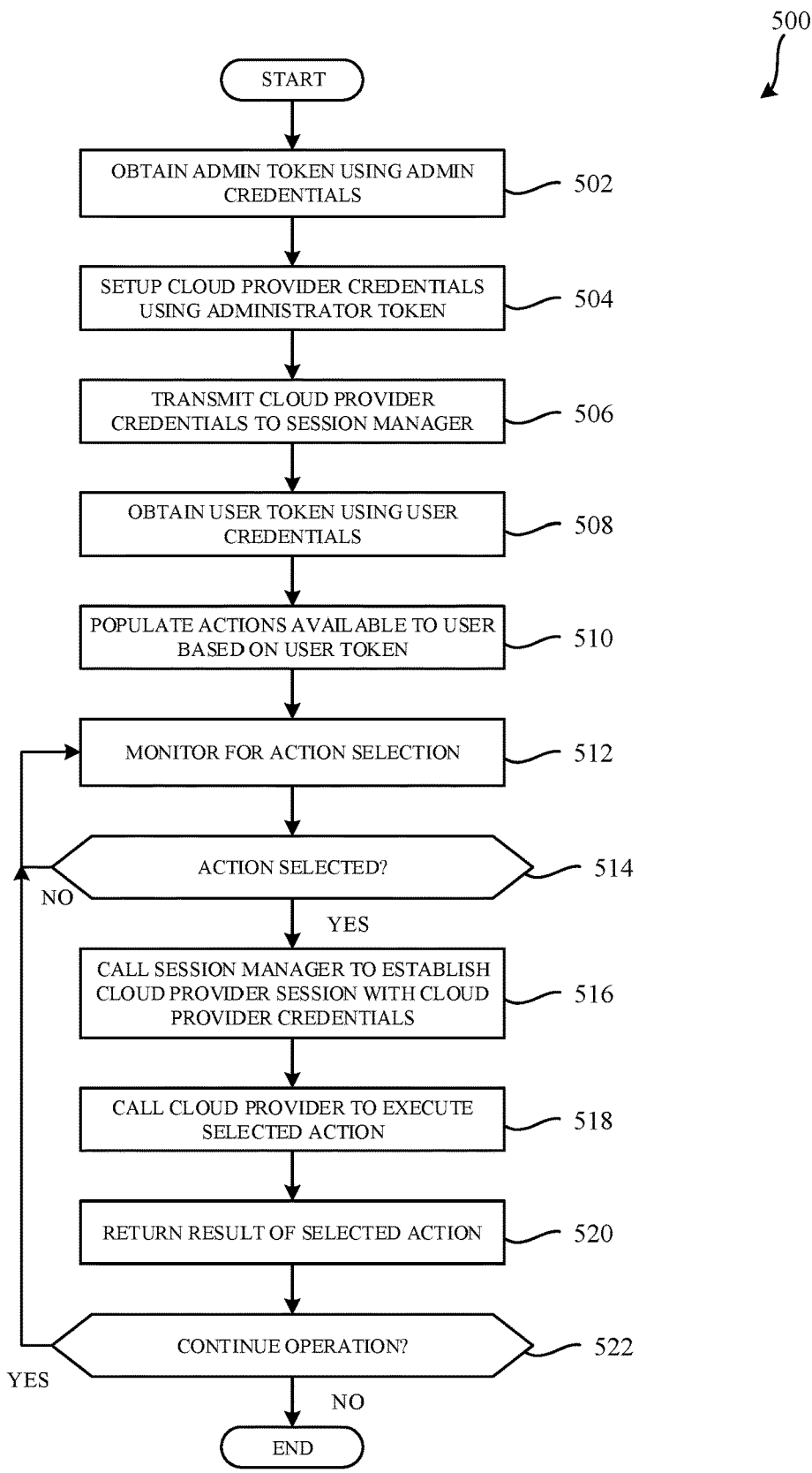
FIG. 5 is a flowchart representative of example machine readable instructions that may be executed to implement the cloud management system of FIG. 1.

FIG. 5 is a flowchart representative of example machine readable instructions 500 that may be executed to implement the cloud management system 100 of FIG. 1. The example machine readable instructions 500 begin at block 502 where the example administrator device 104 obtains an administrator token using administrator credentials. For example, at block 502, the example administrator device 104 uses the administrator credentials to obtain an administrator token from the identity provider 110. At block 504, the example administrator device 104 sets up a cloud provider account including cloud provider credentials using the administrator token. At block 506, the example cloud provider adapter 114 transmits the cloud provider credentials to the example session manager 116. For example, after the example cloud provider adapter 114 obtains the cloud provider credentials from the example administrator device 104, via the second interface 108, the cloud provider adapter 114 transmits the cloud provider credentials to the example session manager 116. In examples disclosed herein, the machine readable instructions of blocks 502-506 are executed at setup of an account with a cloud provider. In other examples, the machine readable instructions of blocks 502-506 may be executed during each operation.

In the example of FIG. 5, the machine readable instructions 500 continue at block 508 where the example user device 102 obtains a user token using user credential. For example, at block 508, the example user device 102 uses the user credentials to obtain a user token from the identity provider 110. At block 510, the example permissions controller 112 populates the first interface 106 with one or more actions available to a user based on the user token. At block 512, the example cloud provider adapter 114 monitors the permissions controller 112 for a selection of one of the actions (e.g., an action selection). For example, when a user device (e.g., the user device 102) selects an action on the permissions controller 112 via the first interface 106, the example permissions controller 112 may generate a signal to the example cloud provider adapter 114 indicating the selected action.

In the example illustrated in FIG. 5, the machine readable instructions 500 continue at block 510 where the example cloud provider adapter 114 determines whether an action has been selected. If the example cloud provider adapter 114 determines that an action has not been selected (block: 514: NO), the example machine readable instructions 500 proceed to block 512. However, if the example cloud provider adapter 114 determines that an action has been selected (block 514: YES), the example machine readable instructions 500 proceed to block 516 where the example cloud provider adapter 114 calls the session manager 116 to establish a cloud provider session user the cloud provider credentials received from the cloud provider adapter 114. At block 518, after the session manager 116 establishes a cloud provider session, the example cloud provider adapter 114 calls the cloud provider 118 to execute the selected action.

In the example illustrated in FIG. 5, the machine readable instructions 500 continue at block 520 where the example cloud provider adapter 114 returns the result of the selected action from the cloud provider 118 to the user device that requested the action (e.g., the user device 102). At block 522, the example cloud provider adapter 114 determines whether to continue operating. For example, a condition that may cause the cloud provider adapter 114 to determine not to continue operating may be the end of an SLA. If the example cloud provider adapter 114 determines not to continue operating (block 522: NO), the machine readable instructions 500 end. However, if the example cloud provider adapter 114 determines to continue operating, the machine readable instructions 500 proceed to block 512.

Figure 6:
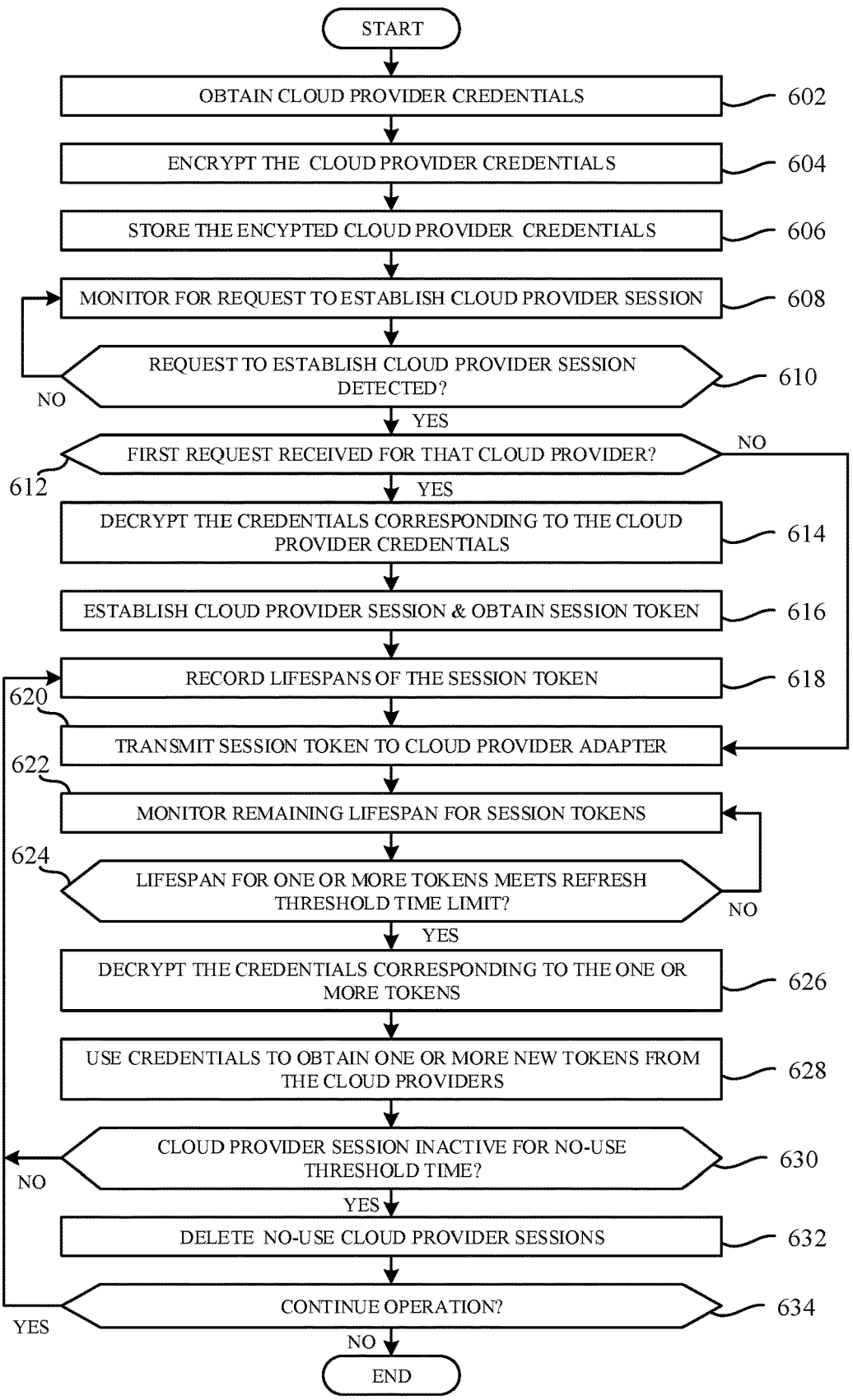
FIG. 6 is a flowchart representative of example machine readable instructions that may be executed to implement the session manager of FIG. 1 and FIG. 2.

FIG. 6 is a flowchart representative of example machine readable instructions 600 that may be executed to implement the session manager 116 of FIG. 1 and FIG. 2. The example machine readable instructions 600 begin at block 602 where the example cloud provider credential security controller 204 obtains cloud provider credentials from the example cloud provider adapter 114. At block 604, the example cloud provider credential security controller 204 encrypts the cloud provider credentials (e.g., encrypts the credentials, is to encrypt the credentials, etc.). Additionally, at block 606, the example cloud provider credential security controller 204 transmits the encrypted cloud provider credentials to the example local storage 208 to be stored. In examples disclosed herein, the machine readable instructions of blocks 602-606 are executed at setup of an account with a cloud provider. In other examples, the machine readable instructions of blocks 602-606 may be executed during each operation.

In the example of FIG. 6, the example machine readable instructions 600 continue at block 608 where the example session controller 206 monitors for a request to establish a cloud provider session. For example, the session controller 206 monitors the network interface 202 for a request to establish a cloud provider session. At block 610, the example session controller 206 determines whether a request to establish a cloud provider session has been detected. If the example session controller 206 determines that no request has been detected (block 610: NO), the example machine readable instructions 600 proceed to block 608. However, if the example session controller 206 determines that a request has been detected (block 610: YES), the example machine readable instructions 600 proceed to block 612.

In the example of FIG. 6, the example machine readable instructions 600 continue at block 612, the example session controller 206 determines whether the received request to establish the cloud provider session is the first request received for the cloud provider. If the example session controller 206 determines that the received request to establish the cloud provider session is not the first request received for the cloud provider (block 612: NO), the example machine readable instructions 600 proceed to block 620. However, if the example session controller 206 determines that the received request to establish the cloud provider session is the first request received for the cloud provider (block 612: YES), the example machine readable instructions 600 proceed to block 614.

In the example of FIG. 6, the example machine readable instructions 600 continue at block 614, the example session controller 206, in response to detecting a request to establish a cloud provider session, transmits a signal to the example cloud provider credential security controller 204 to decrypt the cloud provider credentials associated with the request. At block, 616, after receiving the decrypted cloud provider credentials, the example session controller 206 establishes a cloud provider session with the example cloud provider 118 using the decrypted cloud provider credentials, thereby obtaining a session token corresponding to the cloud provider session.

In the example of FIG. 6, the example machine readable instructions 600 continue at block 618 where the example session controller 206 records a lifespan of the session token obtained when the cloud provider session was established. At block 620, the example session controller 206 transmits the session token to the cloud provider adapter 114.

In the example of FIG. 6, the example machine readable instructions 600 continue at block 622 where the example session controller 206 monitors the lifespan of session tokens corresponding to cloud provider credentials stored with the example session manager 116. At block 624, the example session controller 206 determines whether the lifespan of one or more of the session tokens meets (e.g., is below) a refresh threshold time limit. If the example session controller 206 determines the lifespan of one or more of the session tokens does not meet (e.g., is not below) a refresh threshold time limit (block 624: NO), the example machine readable instructions 600 proceed to block 622. However, if the example session controller 206 determines the lifespan of one or more of the session tokens meets (e.g., is below) a refresh threshold time limit (block 624: YES), the example machine readable instructions 600 proceed to block 626.

In the example illustrated in FIG. 6, the example machine readable instructions 600 continue at block 626 where the example session controller 206, in response to determining that the lifespan on one or more of the session tokens meets (is below) a refresh threshold time limit, transmits a signal to the example cloud provider credential security controller 204 to decrypt the cloud provider credentials associated with the one or more session tokens. At block 628, after receiving the decrypted cloud provider credentials, the example session controller 206 uses the cloud provider credentials to obtain one or more new session tokens from one or more cloud providers. For example, the example session controller 206 uses the cloud provider credentials to re-establish a cloud provider session with the example cloud provider 118, thereby obtaining a new session token corresponding to the cloud provider session.

In the example of FIG. 6, the example machine readable instructions 600 continue at block 630 where the example session controller 206 determines whether any of the cloud provider sessions associated with the cloud provider credentials have been inactive for a threshold amount of time. For example, the session controller 206 determine that a cloud provider session has been inactive for a substantial amount of time if the session controller 206 has not received a request to establish a cloud provider session within 30 minutes of the last request to establish a cloud provider session for a corresponding cloud provider. If the example session controller 206 determines that one or more of the cloud provider sessions associated with the cloud provider credentials have not been inactive for a threshold amount of time (block 630: NO), the example machine readable instructions 600 proceed to block 618. However, if the example session controller 206 determines that one or more of the cloud provider sessions associated with the cloud provider credentials have been inactive for a threshold amount of time (block 630: YES), the example machine readable instructions 600 proceed to block 632.

In the example of FIG. 6, the example machine readable instructions 600 continue at block 632 where the example session controller 206 deletes the one or more cloud provider sessions that have been inactive for a threshold amount of time. For example, the session controller 206 stops refreshing the cloud provider credentials associated with the one or more cloud provider session that have been inactive for the threshold amount of time. At block 634, the example session controller 206 determines whether to continue operating. For example, a condition that may cause the session controller 206 to determine not to continue operating may be the end of an SLA. If the example session controller 206 determines not to continue operating (block 634: NO), the machine readable instructions 600 end. However, if the example session controller 206 determines to continue operating, the machine readable instructions 600 proceed to block 618.

Figure 7:
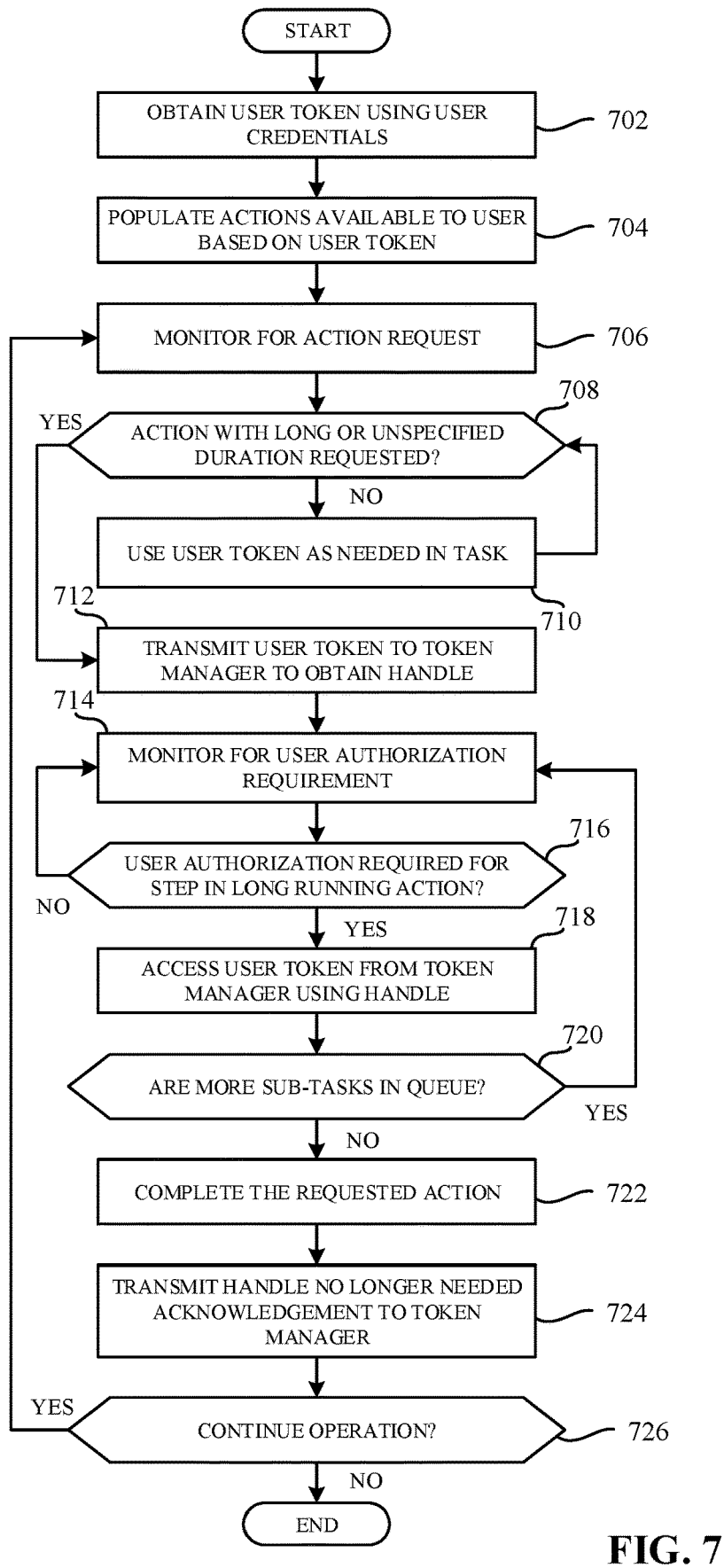
FIG. 7 is a flowchart representative of example machine readable instructions that may be executed to implement the task management system of FIG. 3.

FIG. 7 is a flowchart representative of example machine readable instructions 700 that may be executed to implement the task management system 300 of FIG. 3. The example machine readable instructions 700 begin at block 702 where a user device (e.g., the first user device 302 obtains a user token using user credentials. For example, at block 702, the example first user device 302 uses the user credentials to obtain a user token from the identity provider 308. At block 704, the example permissions controller 310 populates the interface 306 with one or more actions available to a user based on the user token. At block 706, the example task manager 312 monitors the permissions controller 310 for a selection of one of the actions. For example, when a user device (e.g., the first user device 302) selects an action on the permissions controller 310 via the interface 306, the example permissions controller 310 may generate a signal to the example task manager 312 indicating the selected action.

In the example illustrated in FIG. 7, the machine readable instructions 700 continues at block 708 where the example task manager 312 determines whether an action that has been selected includes a long-running duration or an unspecified duration. If the example task manager 312 determines that action that has been selected does not include a long-running duration or an unspecified duration (block: 708: NO), the example machine readable instructions 700 proceed to block 710. However, if the example task manager 312 determines that the action that has been selected includes a long-running duration or an unspecified duration (block 708: YES), the example machine readable instructions 700 proceed to block 712. At block 710, the example task manager 312 calls the example cloud provider 316 to execute the requested action and uses the user token as needed by the task.

In the example illustrated in FIG. 7, the machine readable instructions 700 continue at block 712, where the task manager 312 transmits the user token corresponding to a user associated with the user device that requested the action to the example token manager 314 thereby obtaining a handle corresponding to the user token. At block 714 the example task manager 312 monitors the task being run by the example cloud provider 316 for a sub-task including a need for user authorization.

In the example illustrated in FIG. 7, the machine readable instructions 700 continue at block 716 where the example task manager 312 determines whether user authentication is required for a sub-task of the requested action. If the example task manager 312 determines that user authentication is not required for a sub-task of the requested action (block: 716: NO), the example machine readable instructions 700 proceed to block 714. However, if the example task manager 312 determines that user authentication is required for a sub-task of the requested action (block 716: YES), the example machine readable instructions 700 proceed to block 718. At block 718, the example task manager 312 accesses the user token from the token manager 314 by transmitting the handle to the token manager 314.

In the example illustrated in FIG. 7, the machine readable instructions 700 continue at block 720, where, after authorizing the user with the user token, the example task manager 312 determines whether there are additional sub-tasks included in a queue of sub-tasks associated with the requested action. If the example task manager 312 determines that there are not additional sub-tasks included in a queue of sub-tasks associated with the requested action (block: 720: NO), the example machine readable instructions 700 proceed to block 722. However, if the example task manager 312 determines that there are additional sub-tasks included in a queue of sub-tasks associated with the requested action (block 722: YES), the example machine readable instructions 700 proceed to block 714.

In the example illustrated in FIG. 7, the machine readable instructions 700 continue at block 720, where the example task manager 312 completes the requested action. At block 724, the example task manager 312 transmits an acknowledgement signal to the example token manager 314 indicating that the user token associated with the user device that requested the action is no longer needed. At block 726, the example task manager 312 determines whether to continue operating. For example, a condition that may cause the task manager 312 to determine not to continue operating may be the end of an SLA. If the example task manager 312 determines not to continue operating (block 726: NO), the machine readable instructions 700 end. However, if the example task manager 312 determines to continue operating, the machine readable instructions 700 proceed to block 706.

Figure 8:
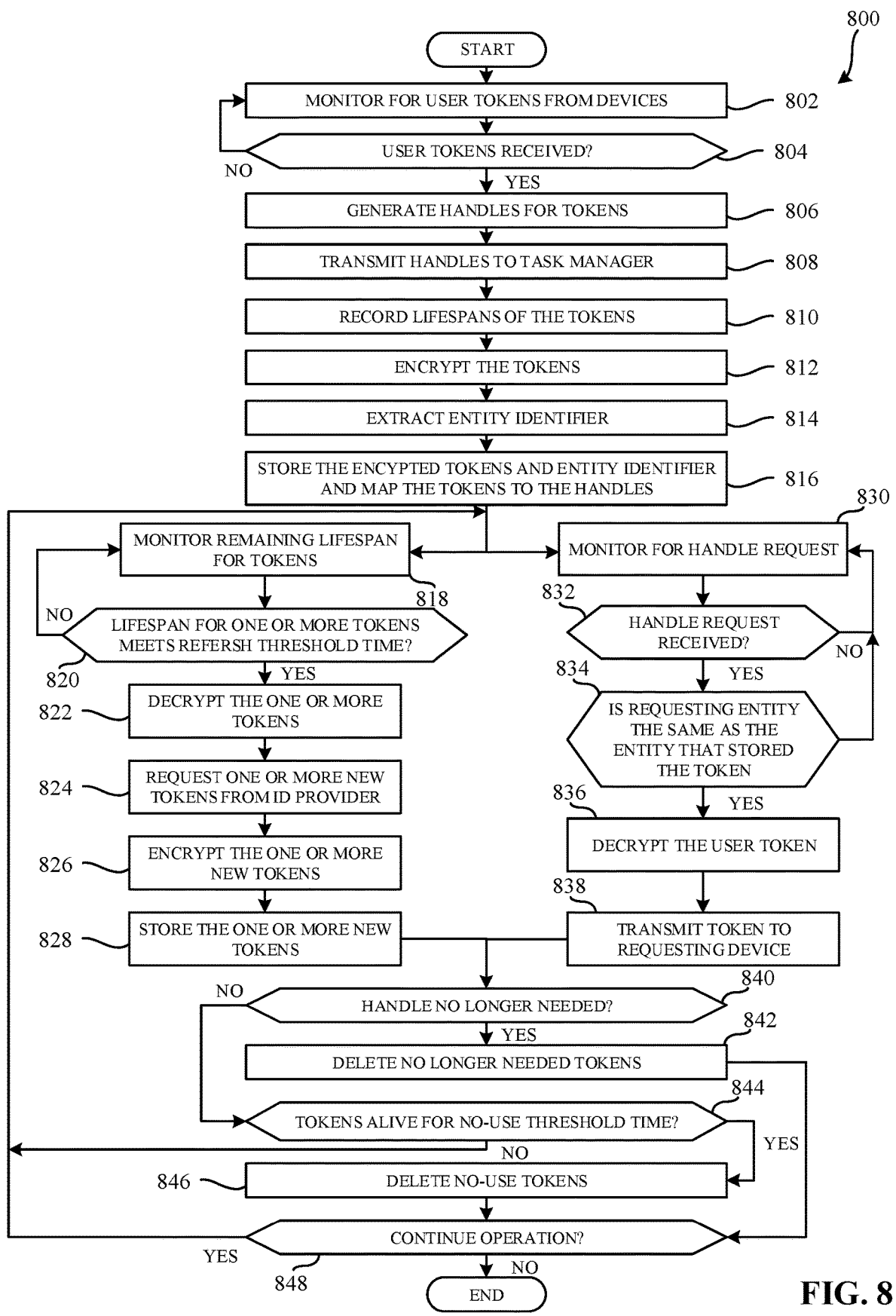
FIG. 8 is a flowchart representative of example machine readable instructions that may be executed to implement the token manager of FIG. 3 and FIG. 4.

FIG. 8 is a flowchart representative of example machine readable instructions 800 that may be executed to implement the token manager 314 of FIG. 3 and FIG. 4. At block 802 the example token handle generator 404 monitors the network interface 402 for user tokens from a task manager. At block 804, the example token handle generator 404 determines whether a token has been received. If the token handle generator 404 determines that a user token has not been received from a task manger (block 804: NO), the machine readable instructions 800 proceed to block 802. If the token handle generator 404 determines that a user token has been received from a task manger (block 804: YES), the machine readable instructions 800 proceed to block 806.

In the example illustrated in FIG. 8, the machine readable instructions 800 continue at block 806, where the example token handle generator 404 generates a handle corresponding to the user token received from the task manager. At block 808, the example token handle generator 404 transmits, via the network interface 402, the handle corresponding to the user token to the task manager 312. At block 810, the example token request controller 408 records the lifespan of the user token. Continuing to block 812, after receiving the user token, the example token security controller 406 encrypts the user token. At block 814, the example token security controller 406 extracts an entity identifier from the entity corresponding to the user device and/or task manager that transmitted the user token to the token manager 314. At block 816, the example token security controller 406 transmits the user token and the entity identifier to the local storage 410 with a mapping configuration between one or more of the handle, the user token, and the entity identifier. After block 816, the example machine readable instructions 800 continue to block 818 and block 830. For example, a device (e.g., a processor) implementing the machine readable instructions 800 may use parallel processing techniques to execute both block 818 and block 830 substantially simultaneously. Although illustrated in parallel, block 818 and block 830 may be executed in parallel, series, or partially in parallel and in series.

In the example illustrated in FIG. 8, the machine readable instructions 800 continue at block 818, where the example token request controller 408 monitors the remaining lifespan of one or more user tokens stored with the example token manager 314. At block 820, the example token request controller 408 determines whether the lifespan of one or more user tokens meets (e.g., is below) a refresh threshold. If the token request controller 408 determines that the lifespan of one or more user tokens does not meet (e.g., is not below) a refresh threshold time limit (block 820: NO), the machine readable instructions 800 proceed to block 818. If the token request controller 408 determines that the lifespan of one or more user tokens meets (e.g., is below) a refresh threshold time limit (block 820: YES), the machine readable instructions 800 proceed to block 822.

In the example illustrated in FIG. 8, the machine readable instructions 800 continue at block 822, where the example token security controller 406 decrypts the one or more user tokens with lifespans that meet (e.g., are below) the refresh threshold time limit. At block 826, the example token request controller 408 requests one or more new user tokens from the identity provider 308. Continue to block 826, the example token security controller 406 encrypts the one or more new user tokens and at block 828, the example token security controller 406 transmits the one or more encrypted new user tokens to the example local storage 410. After block 828, the machine readable instructions 800 proceed to block 840.

In the example illustrated in FIG. 8, at block 830, the example token request controller 408 monitors the network interface 402 for a handle request. For example, the token request controller 408 monitors for the presentation of a handle at the network interface 402. At block 832, the example token request controller 408 determines whether a handle request has been received. If the example token request controller 408 determines that a handle request has not been received (block 832: NO), the machine readable instructions 800 proceed to block 830. If the example token request controller 408 determines that a handle request has been received (block 832: YES), the machine readable instructions 800 proceed to block 834.

In the illustrated example of FIG. 8, at block 834, the example token security controller 406 determines whether the entity requesting the user token is the entity that stored the user token. For example, the example token security controller 406 compares the entity identifier stored in the local storage 410 corresponding to the presented handle with the entity identifier corresponding to the requested device. If the example token security controller 406 determines that the entity requesting the user token is not the entity that stored the user token (block 834: NO), the machine readable instructions 800 proceed to block 830. If the example token security controller 406 determines that the entity requesting the user token is not the entity that stored the user token (block 834: YES), the machine readable instructions 800 proceed to block 836.

In the illustrated example of FIG. 8, at block 836, in response to determining that the entity requesting the user token is the entity that stored the user token, the example token security controller 406 decrypts the user token corresponding to the presented handle. At block 838, the example token security controller 406 transmits the decrypted user token to the requesting entity (e.g., transmits the user token to the requesting entity). After transmitting the user token to the requesting entity at block 838, the machine readable instructions 800 proceed to block 840.

In the illustrated example of FIG. 8, at block 840, the example token request controller 408 determines whether a handle is needed. For example, if the example token request controller 408 receives a notification from a task manager (e.g., the task manager 312) indicating that the user token is no longer needed, the example token request controller 408 determines that the user token is no longer needed. If the example token request controller 408 determines that the user token is no longer needed (block 840: NO), the machine readable instructions 800 proceed to block 844. If the example token request controller 408 determines that the user token is needed (block 840: YES), the machine readable instructions 800 proceed to block 842. At block 842, the example token request controller 408 deletes user tokens that are no longer needed. After block 842, the machine readable instructions 800 proceed to block 848.

In the illustrated example of FIG. 8, at block 844, the example token request controller 408 determines whether any user tokens have been alive for a no-use threshold amount of time. If the example token request controller 408 determines the no-use threshold time limit has not been reached for any user tokens (block: 844: NO), the example machine readable instructions 800 proceed to block 818 and block 830. If the example token request controller 408 determines the no-use threshold time limit has been reached for any token (block: 844: YES), the example machine readable instructions 800 proceed to block 846. At block 846, the example token request controller 408 sends a signal to the local storage 410 to delete one or more tokens that have exceeded their respective no-use threshold time limits.

In the illustrated example of FIG. 8, at block 848, the example token request controller 408 determines whether to continue operating. For example, if additional tokens exist, the example token request controller 408 continues to monitor one or more devices for a handle request and continues to monitor the lifespans of the one or more remaining tokens. If the example token request controller 408 determines not to continue operating (block 848: NO), the example machine readable instructions 800 end. If the example token request controller 408 determines to continue operating (block 848: YES), the example machine readable instructions 800 proceed to block 818 and block 830.

Figure 9:
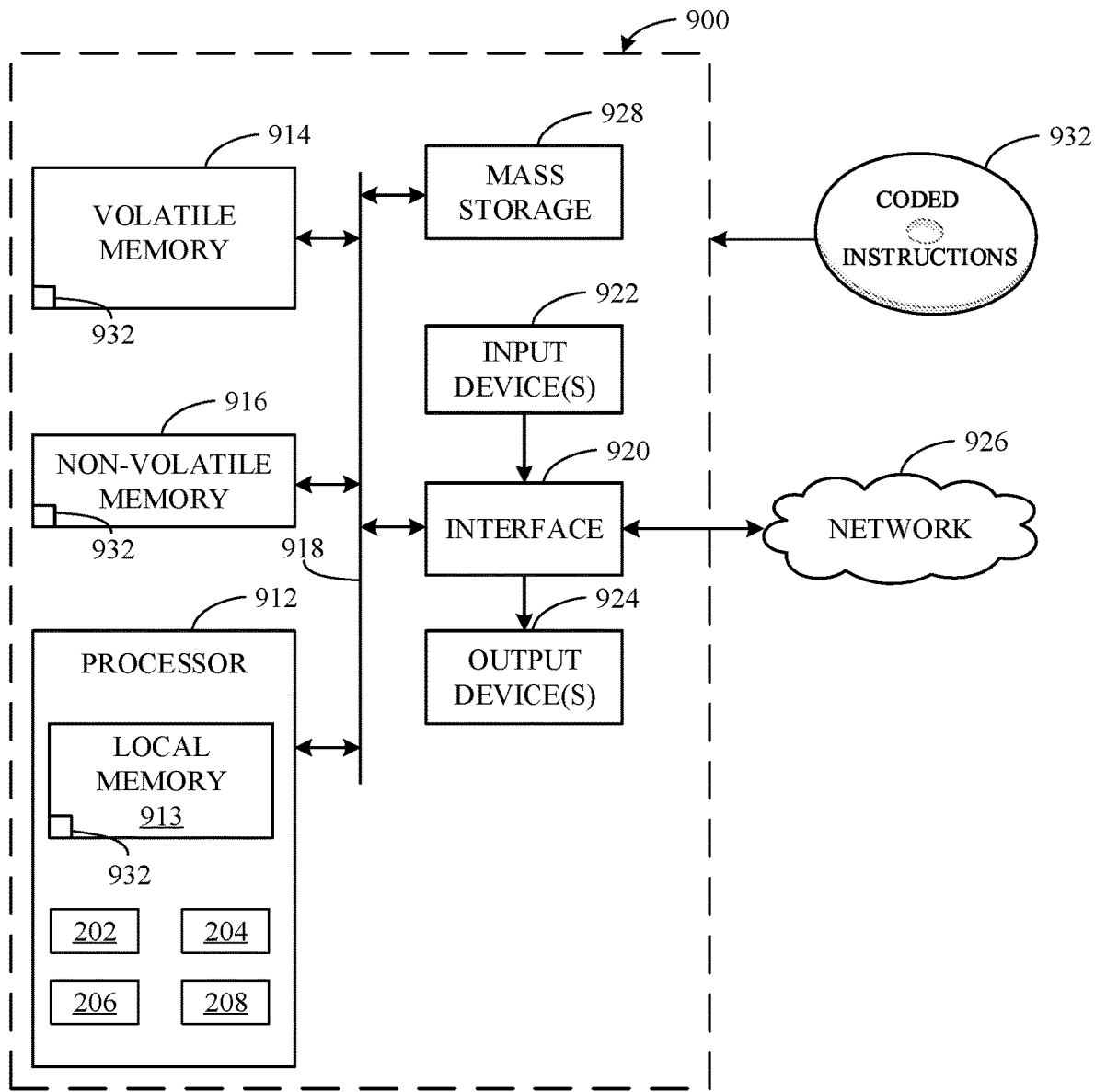
FIG. 9 is a block diagram of an example processor platform structured to execute the instructions of FIG. 5 and/or FIG. 6 to implement the cloud management system of FIG. 1 and/or the session manager of FIG. 1 and FIG. 2.

FIG. 9 is a block diagram of an example processor platform 900 structured to execute the instructions of FIG. 6 to implement the session manager 116 of FIGS. 1 and 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network interface 202, the example cloud provider credential security controller 204, the example session controller 206, and the example local storage 208.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 6 may be stored in the mass storage device 928, in the volatile memory 914, in the non-volatile memory 916, and/or on a removable non-transitory computer readable storage medium such as a CD or DVD.

Figure 10:
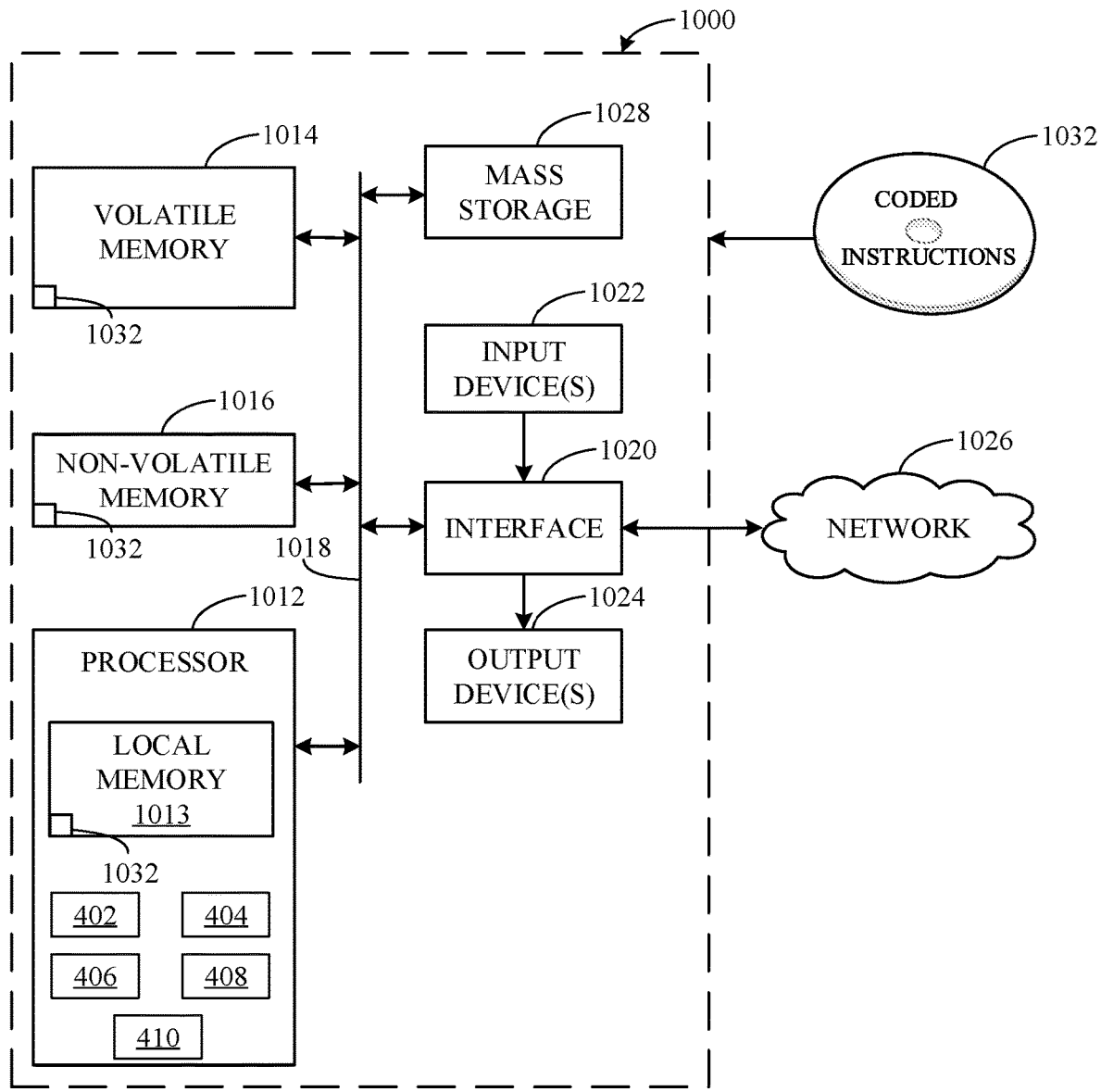
FIG. 10 is a block diagram of an example processor platform structured to execute the instructions of FIG. 7 and/or FIG. 8 to implement the task management system of FIG. 3 and/or the token manager of FIG. 3 and FIG. 4.

FIG. 10 is a block diagram of an example processor platform 1000 structured to execute the instructions of FIG. 8 to implement the token manager 314 of FIGS. 3 and 4. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network interface 402, the example token handle generator 404, the example token security controller 406, the example token request controller 408, and the example local storage 410.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIG. 8 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that prevent the problems associated with a large number of users accessing a cloud provider (e.g., failure of the cloud provider or IaaS provider) without reducing the number of users accessing the cloud provider. Examples disclosed herein reduce the number of cloud provider sessions while maintaining the number of users accessing the cloud provider and funnel user requests through one or more cloud provider sessions. Examples disclosed herein allow for the employees of a business or other entity to access a cloud provider with a single set of cloud provider credentials. Additionally, the employees do not need to be aware of the cloud provider credentials in order to use the cloud provider's services.

Furthermore, the examples disclosed herein allow for long-running tasks and/or tasks with unspecified durations that require user authentication to complete execution without the need for user authentication regardless of the duration of the long-running task and the lifetime of the access token. Furthermore, the examples disclosed herein allow a task that requires user authentication to complete without the user being present, regardless of the duration of the task. The disclosed methods, apparatus and articles of manufacture improve the efficiency of using a computing device by reducing the amount of computing resources to support multiple cloud provider sessions. Furthermore, the examples disclosed herein prevent failure of IaaS computing resources by reducing the number of cloud provider sessions needed to handle multiple users accessing the cloud provider. Additionally, the examples disclosed herein reduces the power consumption of computational resources while they are waiting for user authentication because a user is no longer required to be present for authentication. Additionally, the examples disclosed herein reduce the power consumed when executing tasks that require user authentication because even if a user is not present, the task can execute without failing, thereby reducing redundant computational resources for the task to failover to. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system to manage cloud provider sessions, the system comprising:
    a session manger to:
        in response to detecting a request to establish a session with a cloud provider during which an action including an unspecified duration is to be performed, establish the session using credentials associated with the cloud provider;
        record a lifespan of a session token associated with the session; and
        when the lifespan meets a threshold value, use the credentials to obtain a new session token to refresh the session;
    a cloud provider adapter to, in response to detecting a selection of the action, call the cloud provider to execute the action; and
    a token manager to:
        in response to detecting a request for a user token associated with a user who selected the action, determine whether a device that is to manage the action generated the request for the user token; and
        in response to determining that the device that is to manage the action generated the request for the user token, transmit the user token to the device, at least one of the session manager, the cloud provider adapter, or the token manager implemented by a logic circuit.

2. The system of claim 1, wherein the session manager is to:
    after obtaining the credentials, encrypt the credentials as encrypted credentials; and
    when the lifespan meets the threshold value, decrypt the encrypted credentials to obtain the new session token.

3. The system of claim 1, wherein the request to establish the session with the cloud provider is a first request to establish a first session with the cloud provider, the selection of the action is a first selection, the cloud provider adapter is configured to monitor for the first selection and a second selection, and the session manager is to, in response to detecting a second request to establish a second session with the cloud provider and when the lifespan does not meet the threshold, transmit the session token to the cloud provider adapter to access the cloud provider.

4. The system of claim 1, wherein when the session has been inactive for a threshold amount of time, the session manager is to delete the session token.

5. The system of claim 1, wherein
    the device that is to manage the action is to:
        determine the duration; and
        when the duration is unspecified, transmit the user token associated with the device to the token manager;
    the token manager is to:
        generate a handle corresponding to the user token;
        transmit the handle to the device that is to manage the action; and
    the device that is to manage the action is to, when the action requires user authentication, transmit the handle to the token manager to obtain the user token.

6. The system of claim 1, wherein the token manager is to:
    after obtaining the user token, encrypt the user token as an encrypted user token; and
    in response to determining that the device that is to manage the action generated the request for the user token, decrypt the encrypted user token to obtain the user token.

7. The system of claim 1, wherein the token manager is to, in response to an acknowledgement from the device that is to manage the action, delete the user token.

8. A non-transitory computer readable medium comprising instructions which, when executed, cause a processor to at least:
    in response to detecting a request to establish a session with a cloud provider during which an action including an unspecified duration is to be performed, establish the session using credentials associated with the cloud provider;
    record a lifespan of a session token associated with the session;
    when the lifespan meets a threshold value, use the credentials to obtain a new session token to refresh the session;
    in response to detecting a selection of the action, call the cloud provider to execute the action;
    in response to detecting a request for a user token associated with a user who selected the action, determine whether an authorized device permitted to request the user token on behalf of the user transmitted the request for the user token; and
    in response to determining that the authorized device transmitted the request for the user token, transmit the user token to the authorized device.

9. The non-transitory computer readable medium of claim 8, wherein the instructions, when executed, cause the processor to:
    after obtaining the credentials, encrypt the credentials as encrypted credentials; and
    when the lifespan meets the threshold value, decrypt the encrypted credentials to obtain the new session token.

10. The non-transitory computer readable medium of claim 8, wherein the request to establish the session with the cloud provider is a first request to establish a first session with the cloud provider, the selection of the action is a first selection, and the instructions, when executed, cause the processor to:
    monitor for the first selection and a second action selection; and
    in response to detecting a second request to establish a second session with the cloud provider and when the lifespan does not meet the threshold, access the cloud provider using the session token.

11. The non-transitory computer readable medium of claim 8, wherein the instructions, when executed, cause the processor to, when the session has been inactive for a threshold amount of time, delete the session token.

12. The non-transitory computer readable medium of claim 8, wherein the instructions, when executed, cause the processor to, when the duration is unspecified, generate a handle corresponding to the user token.

13. The non-transitory computer readable medium of claim 8, wherein the instructions, when executed, cause the processor to:
  after obtaining the user token, encrypt the user token as an encrypted user token; and
  in response to determining that the authorized device transmitted the request for the user token, decrypt the encrypted user token to obtain the user token.

14. The non-transitory computer readable medium of claim 8, wherein the instructions, when executed, cause the processor to, in response to an acknowledgement from the authorized device, delete the user token.

15. A method for managing cloud provider session, the method comprising:
  in response to detecting a request to establish a session with a cloud provider during which an action including an unspecified duration is to be performed, establishing the session using credentials associated with the cloud provider;
  recording a lifespan of a session token associated with the session;
  when the lifespan meets a threshold value, using the credentials to obtain a new session token to refresh the session;
  in response to detecting a selection of the action, calling the cloud provider to execute the action;
  in response to detecting a request for a user token associated with a user who selected the action, determining whether an authorized device permitted to request the user token on behalf of the user transmitted the request for the user token; and
  in response to determining that the authorized device transmitted the request for the user token, transmitting the user token to the authorized device.

16. The method of claim 15, further including:
  after obtaining the credentials, encrypting the credentials as encrypted credentials; and
  when the lifespan meets the threshold value, decrypting the encrypted credentials to obtain the new session token.

17. The method of claim 15, wherein the request to establish the session with the cloud provider is a first request to establish a first session with the cloud provider, the selection of the action is a first selection, and the method further includes:
  monitoring for the first selection and a second action selection; and
  in response to detecting a second request to establish a second session with the cloud provider and when the lifespan does not meet the threshold, accessing the cloud provider using the session token.

18. The method of claim 15, further including, when the session has been inactive for a threshold amount of time, deleting the session token.

19. The method of claim 15, further including, when the duration is unspecified, generating a handle corresponding to the user token.

20. The method of claim 15, further including, in response to an acknowledgement from the authorized device, deleting the user token.

* * * * *